US009398344B2

(12) United States Patent
Lee et al.

(10) Patent No.: US 9,398,344 B2
(45) Date of Patent: Jul. 19, 2016

(54) IMAGE DISPLAY APPARATUS, MOBILE TERMINAL AND METHOD FOR OPERATING THE SAME

(71) Applicant: LG ELECTRONICS INC., Seoul (KR)

(72) Inventors: Seokhee Lee, Seoul (KR); Sunjung Hwang, Seoul (KR); Myonggu Lee, Seoul (KR); Sungho Shin, Seoul (KR); Seongpyo Hong, Seoul (KR); Youngho Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 438 days.

(21) Appl. No.: 13/840,366

(22) Filed: Mar. 15, 2013

(65) Prior Publication Data

US 2013/0330053 A1    Dec. 12, 2013

(30) Foreign Application Priority Data

Jun. 8, 2012   (KR) .................. 10-2012-0061623
Jun. 8, 2012   (KR) .................. 10-2012-0061625

(51) Int. Cl.

| H04N 21/485 | (2011.01) |
|---|---|
| H04N 21/41 | (2011.01) |
| H04N 21/47 | (2011.01) |
| H04N 21/643 | (2011.01) |
| H04N 21/6437 | (2011.01) |
| H04N 21/81 | (2011.01) |

(52) U.S. Cl.
CPC ....... *H04N 21/4852* (2013.01); *H04N 21/4126* (2013.01); *H04N 21/47* (2013.01); *H04N 21/6437* (2013.01); *H04N 21/64322* (2013.01); *H04N 21/8113* (2013.01)

(58) Field of Classification Search
None
See application file for complete search history.

(56) References Cited

U.S. PATENT DOCUMENTS

| 2001/0051983 | A1* | 12/2001 | Williams ............... G06Q 30/02 709/204 |
|---|---|---|---|
| 2002/0196771 | A1* | 12/2002 | Vij ........................ H04L 12/66 370/349 |
| 2003/0101294 | A1 | 5/2003 | Saint-Hilaire et al. |
| 2004/0160907 | A1* | 8/2004 | Perlman ................ H04W 88/08 370/319 |
| 2005/0262251 | A1* | 11/2005 | Klemets ............ H04L 29/06027 709/230 |
| 2006/0209745 | A1* | 9/2006 | MacMullan .......... G06F 3/1454 370/328 |
| 2007/0049117 | A1* | 3/2007 | Heo ....................... H04N 5/775 439/607.01 |
| 2007/0153762 | A1 | 7/2007 | Park et al. |
| 2008/0034104 | A1* | 2/2008 | Kariti .................... G06Q 10/10 709/231 |
| 2008/0250462 | A1* | 10/2008 | Crohas ................. H04N 5/4403 725/74 |

(Continued)

FOREIGN PATENT DOCUMENTS

| CN | 1784674 A | 6/2006 |
|---|---|---|
| CN | 101999234 A | 3/2011 |

(Continued)

*Primary Examiner* — Hung Dang
*Assistant Examiner* — Sunghyoun Park
(74) *Attorney, Agent, or Firm* — Birch, Stewart, Kolasch & Birch, LLP

(57) ABSTRACT

An image display apparatus, a mobile terminal and a method for operating the same are discussed. The method for operating the image display apparatus includes entering a wireless audio transmission mode, performing synchronization with a mobile terminal using a first wireless communication method, extracting audio data from multimedia data, and transmitting the extracted audio data to the mobile terminal using a second wireless communication method different from the first wireless communication method. By this configuration, it is possible to improve user convenience.

11 Claims, 24 Drawing Sheets

(56) References Cited

U.S. PATENT DOCUMENTS

2011/0032856 A1* 2/2011 Ozawa ............... H04L 12/6418
                                                    370/310
2012/0099594 A1   4/2012 Lau et al.

FOREIGN PATENT DOCUMENTS

EP    1 424 827 A1    6/2003
EP    2 271 097 A1    1/2011

* cited by examiner

IP Streaming Packet Structure (a)  (b)

(a)  (b)  (c)

Buffer value = 2ms

Buffer value = 10ms

IMAGE DISPLAY APPARATUS, MOBILE TERMINAL AND METHOD FOR OPERATING THE SAME

CROSS-REFERENCE TO RELATED APPLICATION

This application claims the priority to and the benefit of Korean Patent Application Nos. 10-2012-0061623 and 10-2012-0061625, filed on Jun. 8, 2012 in the Korean Intellectual Property Office, the disclosure of which is incorporated herein by reference.

BACKGROUND OF THE INVENTION

1. Field of the Invention

Embodiments of the invention relate to an image display apparatus, a mobile terminal and a method for operating the same, and more particularly to an image display apparatus, a mobile terminal and a method for operating the same, which are capable of improving user convenience.

2. Description of the Related Art

An image display apparatus functions to display images to a user. A user can view a broadcast program using an image display apparatus. The image display apparatus can display a broadcast program selected by the user on a display from among broadcast programs transmitted from broadcasting stations. The recent trend in broadcasting is a worldwide transition from analog broadcasting to digital broadcasting.

Digital broadcasting transmits digital audio and video signals. Digital broadcasting offers many advantages over analog broadcasting, such as robustness against noise, less data loss, ease of error correction, and the ability to provide clear, high-definition images. Digital broadcasting also allows interactive viewer services, compared to analog broadcasting.

SUMMARY OF THE INVENTION

Therefore, the invention has been made in view of the above problems, and it is an object of the invention to provide an image display apparatus, a mobile terminal and a method for operating the same, which are capable of improving user convenience.

It is another object of the invention to provide an image display apparatus, a mobile terminal and a method for operating the same, which are capable of conveniently transmitting and playing back audio data between the image display apparatus and the mobile terminal in a wireless manner.

In accordance with an aspect of the invention, the above and other objects can be accomplished by the provision of a method for operating an image display apparatus including entering a wireless audio transmission mode, performing synchronization with a mobile terminal using a first wireless communication method, extracting audio data from multimedia data, and transmitting the extracted audio data to the mobile terminal using a second wireless communication method different from the first wireless communication method.

In accordance with another aspect of the invention, there is provided a method for operating a mobile terminal including performing synchronization with an image display apparatus using a first wireless communication method according to a wireless audio transmission mode, receiving audio data from the image display apparatus using a second wireless communication method different from the first wireless communication method, and playing back the received audio data.

In accordance with another aspect of the invention, there is provided an image display apparatus including a display, a network interface configured to exchange data with a mobile terminal, and a controller configured to perform synchronization with the mobile terminal using a first wireless communication method according to a wireless audio transmission mode, to extract audio data from multimedia data, and to transmit the extracted audio data to the mobile terminal using a second wireless communication method different from the first wireless communication method.

In accordance with another aspect of the invention, there is provided a mobile terminal including an audio output module configured to output an audio signal to be played back, a wireless communication unit configured to exchange data with an image display apparatus, and a controller configured to perform synchronization with the image display apparatus using a first wireless communication method according to a wireless audio transmission mode and to play back audio data received from the image display apparatus using a second wireless communication method different from the first wireless communication method.

In accordance with another aspect of the invention, there is provided a method for operating an image display apparatus including receiving a wireless audio transmission mode entrance signal from a mobile terminal, transmitting information about audio data to be transmitted to the mobile terminal, receiving decoding information from the mobile terminal, transmitting audio data of an encoding state corresponding to the decoding information, and playing back multimedia data associated with the audio data.

In accordance with another aspect of the invention, there is provided a method for operating an image display apparatus including transmitting audio data of multimedia data to a mobile terminal, playing back the multimedia data, receiving wireless channel environment information between the mobile terminal and the image display apparatus or playback delay information of the mobile terminal during the multimedia data playback, and performing signal processing such that the multimedia data playback is synchronized with audio data playback of the mobile terminal based on the wireless channel environment information or the playback delay information.

In accordance with another aspect of the invention, there is provided a method for operating a mobile terminal including transmitting a wireless audio transmission mode entrance signal to an image display apparatus, receiving information about audio data to be transmitted from the image display apparatus, transmitting decoding information indicating whether audio data to be received can be decoded to the image display apparatus based on information about the audio data, receiving audio data of an encoding state corresponding to the decoding information from the image display apparatus, and playing back the received audio data.

In accordance with another aspect of the invention, there is provided a method for operating a mobile terminal including receiving audio data from an image display apparatus, calculating playback delay information of the audio data, playing back the audio data, transmitting wireless channel environment information between the mobile terminal and the image display apparatus or the playback delay information to the image display apparatus, receiving audio data corresponding to the wireless channel environment information or the playback delay information, and playing back the audio data corresponding to the wireless channel environment information or the playback delay information.

In accordance with another aspect of the invention, there is provided an image display apparatus including a display, a network interface configured to exchange data with a mobile terminal, and a controller configured to transmit information about audio data to be transmitted to the mobile terminal if a wireless audio transmission mode entrance signal is received from the mobile terminal, to transmit audio data of an encoding state corresponding to decoding information if the decoding information is received from the mobile terminal, and to play back multimedia data associated with the audio data.

In accordance with another aspect of the invention, there is provided a mobile terminal including an audio output module configured to output an audio signal to be played back, a wireless communication unit configured to exchange data with an image display apparatus, and a controller configured to transmit a wireless audio transmission mode entrance signal to the image display apparatus, to transmit decoding information indicating whether audio data to be received can be decoded to the image display apparatus based on information about audio data if the information about the audio data is received from the image display apparatus, and to play back the received audio data if audio data of an encoding state corresponding to the decoding information is received from the image display apparatus.

BRIEF DESCRIPTION OF THE DRAWINGS

The above and other objects, features and other advantages of the invention will be more clearly understood from the following detailed description taken in conjunction with the accompanying drawings, in which.

DETAILED DESCRIPTION OF THE EMBODIMENTS

Example embodiments of the invention will be described with reference to the attached drawings.

The terms "module" and "unit" attached to describe the names of components are used herein to help the understanding of the components and thus they should not be considered as having specific meanings or roles. Accordingly, the terms "module" and "unit" may be used interchangeably.

Figure 1:
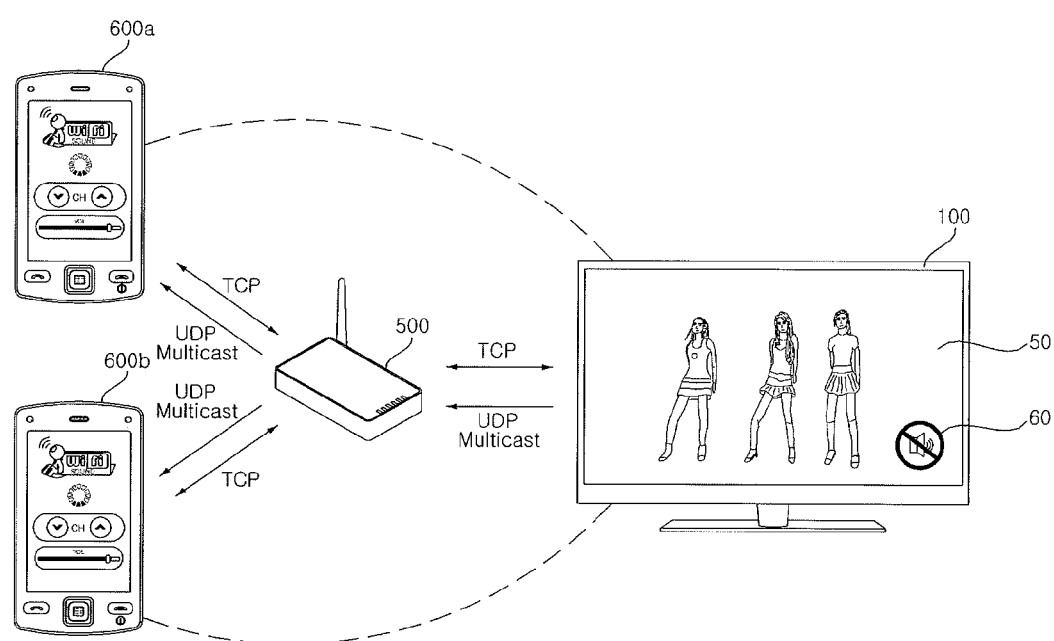
FIG. 1 is a block diagram showing a configuration of an image display system according to an embodiment of the invention.

FIG. 1 is a diagram showing an image display system according to an embodiment of the invention.

Referring to FIG. 1, the image display system 10 according to the embodiment of the invention may include an image display apparatus 100, a mobile terminal 600 (e.g., mobile terminals 600*a* and 600*b*) and a network router 500.

The image display apparatus 100 may receive content. For example, the image display apparatus may receive a broadcast signal via an antenna, receive an external input signal from an external device via a High-Definition Multimedia Interface (HDMI) terminal, or receive a streaming signal from a predetermined network router 500 via a network.

The image display apparatus 100 may process the received broadcast signal, external input signal or streaming signal, display video on a display 180 and output audio.

In the embodiment of the invention, the image display apparatus 100 wirelessly transmits audio data to an external device, for example, a mobile terminal 600, in a wireless audio transmission mode. For audio transmission, the image display apparatus 100 may perform direct or indirect communication with the mobile terminal.

In FIG. 1, data is exchanged between the image display apparatus 100 and the mobile terminal 600 via the network router 500.

The image display apparatus 100 may include a TV, a monitor, a computer, a laptop, a tablet PC, etc., all of which are capable of displaying broadcast content.

The network router 500 provides a network such that data is exchanged between the image display apparatus 100 and the mobile terminal 600.

For example, if the network router 500 is a wireless network router, a plurality of virtual IP addresses may be internally allocated to the image display apparatus 100 and the mobile terminal 600, respectively, while utilizing the same external Internet Protocol (IP) address. Wireless channels may be allocated in correspondence with the virtual IP addresses.

That is, the network router 500 may allocate a first wireless channel to the image display apparatus 100 in correspondence with a first virtual IP address, allocate a second wireless channel to a first mobile terminal 600*a* in correspondence with a second virtual IP address, and allocate a third wireless channel to a second mobile terminal 600*b* in correspondence with a third virtual IP address.

The network router 500 control data exchange between the image display apparatus 100 and the mobile terminals 600a and 600b via the channels respectively allocated thereto.

If an electronic apparatus capable of performing wireless data communication is added to a wireless network provided by the network router 500, the network router 500 may additionally allocate a virtual IP address and a wireless channel to the electronic apparatus, as described above.

The network router 500 may provide environment information of the wireless channels respectively corresponding to the image display apparatus 100 and the mobile terminals 600a and 600b. For example, the network router may provide security information, channel name information, signal intensity information etc., of the wireless channels.

The wireless network provided by the network router 500 may be a WiFi based wireless network.

The mobile terminal 600 may perform voice communication or data communication and examples thereof include a mobile phone, a smart phone, a laptop, a tablet PC, etc.

In the embodiment of the invention, the mobile terminal 600 may wirelessly receive audio data from an external device, for example, the image display apparatus 100, in a wireless audio reception mode. For audio data reception, the mobile terminal 600 may perform direct or indirect communication with the image display apparatus 100.

In the embodiment of the invention, if the wireless audio transmission/reception mode is performed, first, the image display apparatus 100 and the mobile terminals 600a and 600b are synchronized using a first wireless communication method. That is, control data may be transmitted from the mobile terminals 600a and 600b to the image display apparatus 100 and feedback data corresponding to the control data may be transmitted from the image display apparatus 100 to the mobile terminals 600a and 600b.

The control data may include at least one of wireless audio transmission mode start or end information, wireless channel setting request information, wireless channel change request information, allocated wireless channel information, decoding information, wireless channel environment information or playback delay information. The feedback data may include at least one of information about the number of channels of audio data to be transmitted, encoding state information, encoding scheme information, playback point-of-time information, or current time information.

In order to secure data communication reliability, the first wireless communication method is a two-way communication method and may be a transmission control protocol (TCP) based communication method.

For example, if a wireless audio reception mode start signal is transmitted as TCP packet data from the first mobile terminal 600a to the image display apparatus 100 via the wireless router (or the network router) 500, the image display apparatus 100 may transmit information about the number of channels of the audio data to be transmitted of multimedia data played back (or reproduced) by the image display apparatus, encoding state information, encoding scheme information, etc., to the first mobile terminal 600a via the wireless router 500, for the wireless audio transmission mode.

Next, if synchronization between the image display apparatus 100 and the mobile terminals 600a and 600b is completed, the image display apparatus 100 may transmit audio data to the mobile terminals 600a and 600b via the wireless router 500 using a second wireless communication method different from the first wireless communication method.

For low-delay streaming of audio data and multi-user support, the second wireless communication method may be a one-way and multicast based communication method and may be a real time transmission protocol (RTP)/user datagram protocol (UDP) based communication method.

For example, if synchronization between the first and second mobile terminals 600a and 600b and the image display apparatus 100 is completed, the image display apparatus 100 may transmit an RTP/UDP packet including an audio signal of a broadcast image which is currently being played back by the image display apparatus 100 to the first and second mobile terminals 600a and 600b via the wireless router 500.

The transmitted audio signal may be adaptively changed depending on whether the audio signal can be decoded in the mobile terminal, a wireless channel environment, playback delay of the mobile terminal, etc. For example, various audio signals such as a demultiplexed audio signal of a stereo channel, a demultiplexed audio signal of a mono channel, a decoded audio signal of a stereo channel, a decoded audio signal of a mono channel, an encoded audio signal of a stereo channel and an encoded audio signal of a mono channel may be transmitted from the image display apparatus 100 to the mobile terminals 600a and 600b.

When the audio data is transmitted, playback point-of-time information of the audio data, current time information, etc., may be transmitted to the mobile terminals 600a and 600b. At this time, the playback point-of-time information and the current time information may be transmitted to the mobile terminals 600a and 600b via the wireless router 500 together with the audio data in the form of an RTP/UDP packet or may be transmitted to the mobile terminals 600a and 600b via the wireless router 500 as TCP packet data separately from the audio data.

Unlike FIG. 1, wireless data communication between the image display apparatus 100 and the mobile terminals 600a and 600b is possible without the network router 500. At this time, WiFi Direct based data communication may be performed between the image display apparatus 100 and the mobile terminals 600a and 600b.

Figure 2:
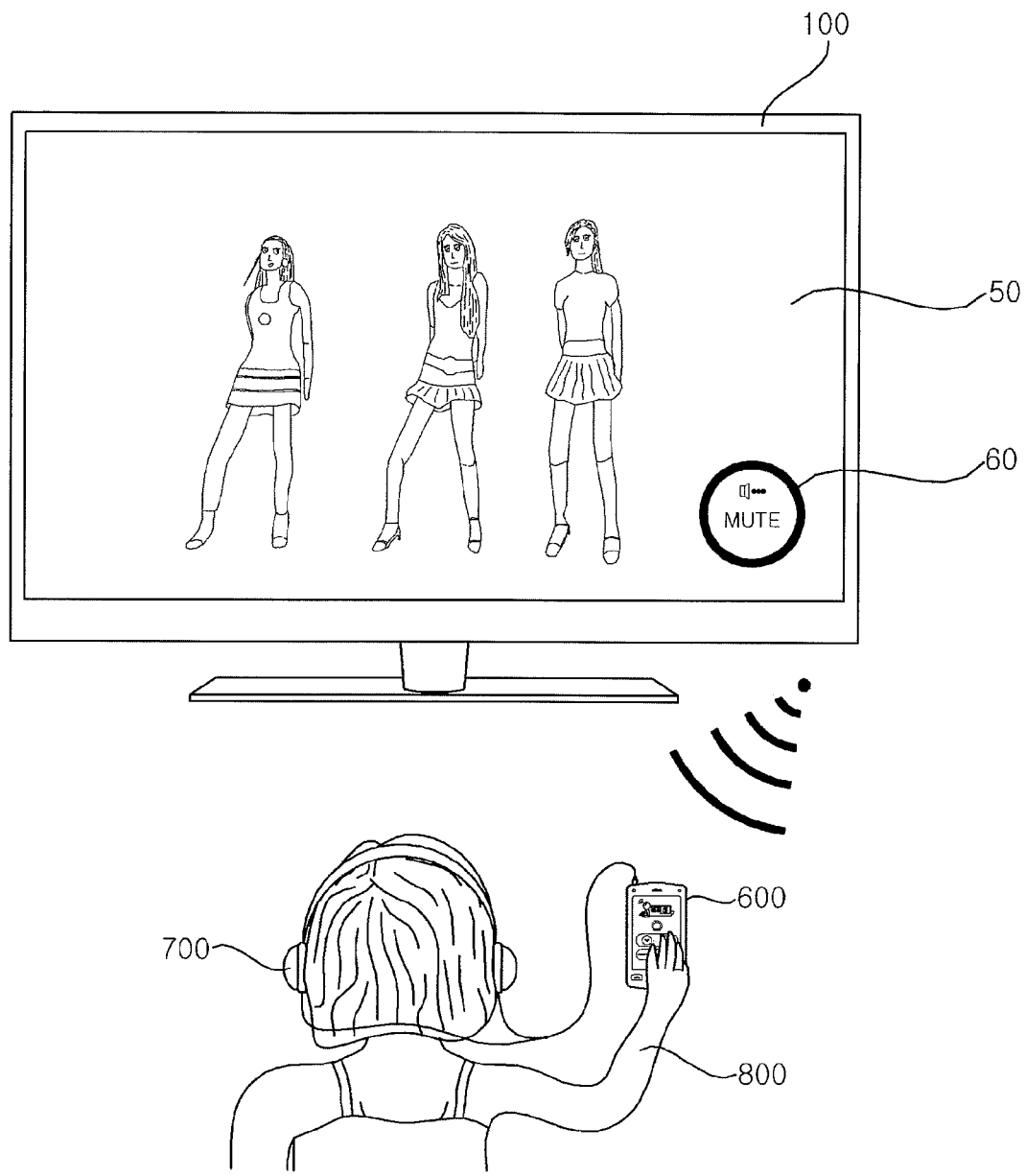
FIG. 2 is a diagram showing an instance in which a user listens to an audio signal using the image display system of FIG. 1.

FIG. 2 is a diagram showing an instance in which a user listens to an audio signal using the image display system of FIG. 1.

Referring to FIG. 2, if a wireless audio transmission/reception mode is initiated in the image display system according to the embodiment of the invention, video data 50 of multimedia data displayed on the image display apparatus 100 may be continuously played back and displayed and audio data of the multimedia data may be transmitted to the mobile terminal 600. The mobile terminal 600 play back the audio data received from the image display apparatus 100.

Then, a user 800 may conveniently listen to audio data corresponding to the video data of the multimedia data displayed on the image display apparatus 100 using an earphone 700 through the mobile terminal 600.

In particular, in the wireless audio transmission mode, an audio output unit 185 of the image display apparatus 100 is in a mute mode and thus may not output an audio signal directly. Thus, other users who do not wish to listen to the audio data may not listen to the audio signal when the image display apparatus 100 plays back the multimedia data.

In FIG. 2, an object 60 representing the mute mode is displayed on the display 180 of the image display apparatus 100.

Figure 3:
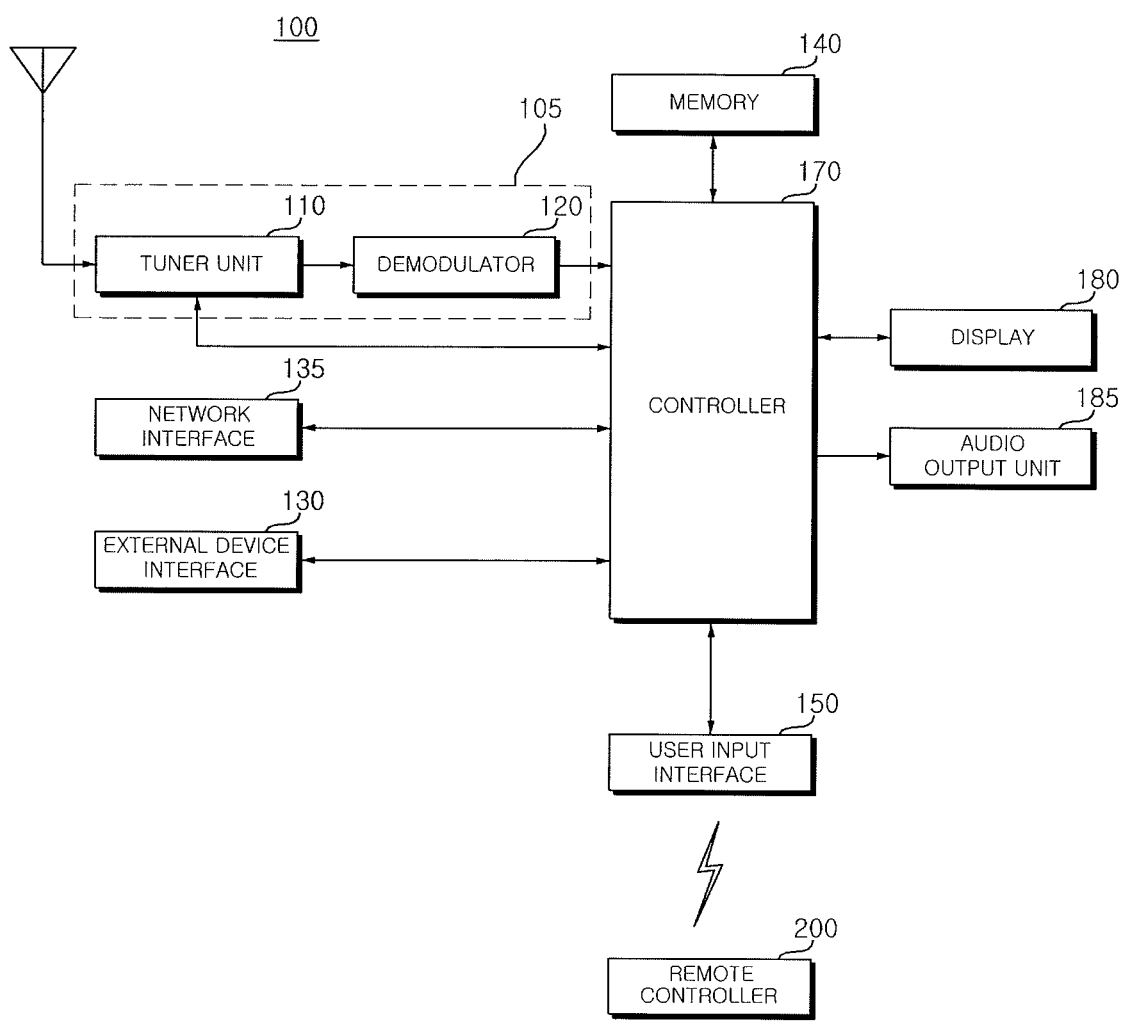
FIG. 3 is a block diagram showing the internal configuration of an image display apparatus of FIG. 1.

FIG. 3 is a block diagram showing the internal configuration of the image display apparatus of FIG. 1.

Referring to FIG. 3, the image display apparatus 100 according to the embodiment of the invention includes a broadcast reception unit 105, an external device interface 130, a memory 140, a user input interface 150, a sensor unit, a controller 170, a display 180, an audio output unit 185 and a remote controller 200.

The broadcast reception unit 105 may include a tuner unit 110, a demodulator 120 and/or a network interface 135. As needed, the broadcast reception unit 105 may include only the tuner unit 110 and the demodulator 120 or only the network interface 135.

The tuner unit 110 tunes to a Radio Frequency (RF) broadcast signal corresponding to a channel selected by a user from among RF broadcast signals received through an antenna or RF broadcast signals corresponding to all channels previously stored in the image display apparatus. The tuned RF broadcast is converted into an Intermediate Frequency (IF) signal or a baseband Audio/Video (AV) signal.

For example, the tuned RF broadcast signal is converted into a digital IF signal DIF if it is a digital broadcast signal and is converted into an analog baseband AV signal (Composite Video Banking Sync/Sound Intermediate Frequency (CVBS/SIF)) if it is an analog broadcast signal. That is, the tuner unit 110 may process a digital broadcast signal or an analog broadcast signal. The analog baseband AV signal (CUBS/SIF) output from the tuner unit 110 may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus by a channel storage function from a plurality of RF signals received through the antenna and may convert the selected RF broadcast signals into IF signals or baseband A/V signals.

The tuner unit 110 may include a plurality of tuners in order to receive broadcast signals of a plurality of channels. Alternatively, the tuner unit may include a single tuner for simultaneously receiving broadcast signals of a plurality of channels.

The demodulator 120 receives the digital IF signal DIF from the tuner unit 110 and demodulates the digital IF signal DIF.

The demodulator 120 may perform demodulation and channel decoding, thereby obtaining a stream signal TS. The stream signal may be a signal in which a video signal, an audio signal and a data signal are multiplexed.

The stream signal output from the demodulator 120 may be input to the controller 170 and thus subjected to demultiplexing and A/V signal processing. The processed video and audio signals are output to the display 180 and the audio output unit 185, respectively.

The external device interface 130 may serve to transmit or receive data to or from an external device connected thereto. For interfacing, the external device interface 130 may include an A/V Input/Output (I/O) unit and/or a wireless communication module.

The external device interface 130 may be connected to an external device such as a Digital Versatile Disc (DVD) player, a Blu-ray player, a game console, a camera, a camcorder, or a computer (e.g., a laptop computer), wirelessly or by wire so as to perform an input/output operation with respect to the external device.

The A/V I/O unit externally receives video and audio signals from the external device. The wireless communication unit may perform short-range wireless communication with another electronic apparatus.

The network interface 135 serves as an interface between the image display apparatus 100 and a wired/wireless network such as the Internet. The network interface 135 may include a wired communication unit or a wireless communication unit.

For example, the network interface 135 may receive content or data provided by an Internet or content provider or a network operator over a network.

The network interface 135 performs data communication with the network router 500 and can perform data exchange within the network of the network router 500.

In the embodiment of the embodiment of the invention, in the wireless audio transmission mode, for synchronization with the mobile terminal 600, the network interface 135 may receive control data of a TCP packet format from the mobile terminal 600 via the network router 500 and transmit feedback data of a TCP packet format to the mobile terminal 600 via the network router 500.

After synchronization is completed, the network interface 135 may transmit audio data of an RTP/UDP packet format corresponding to the multimedia data played back (or reproduced) by the image display apparatus to the mobile terminal 600 via the network router 500.

The memory 140 may store various programs necessary for the controller 170 to process and control signals, and may also store processed video, audio and data signals.

The memory 140 may temporarily store a video, audio and/or data signal received from the external device interface 130. The memory 140 may store information about a predetermined broadcast channel by the channel storage function of a channel map.

While the memory 140 is shown in FIG. 3 as being configured separately from the controller 170, to which the invention is not limited, the memory 140 may be incorporated into the controller 170.

The user input interface 150 transmits a signal input by the user to the controller 170 or transmits a signal received from the controller 170 to the user.

For example, the user input interface 150 may transmit/receive various user input signals such as a power-on/off signal, a channel selection signal, and a screen setting signal from a remote controller 200, may provide the controller 170 with user input signals received from local keys, such as inputs of a power key, a channel key, and a volume key, and setting values, or provide the controller 170 with a user input signal received from a sensor unit for sensing a user gesture, or transmit a signal received from the controller 170 to a sensor unit.

The controller 170 may demultiplex the stream signal received from the tuner unit 110, the demodulator 120, or the external device interface 130 into a number of signals, process the demultiplexed signals into audio and video data, and output the audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to the external output device through the external device interface 130.

The controller 170 may include a DEMUX, a video processor, etc., which will be described in detail later with reference to FIG. 4.

The controller 170 may control the overall operation of the image display apparatus 100. For example, the controller 170 controls the tuner unit 110 to tune to an RF signal corresponding to a channel selected by the user or a previously stored channel.

The controller 170 may control the image display apparatus 100 by a user command input through the user input interface 150 or an internal program.

The controller 170 may control the display 180 to display images. The image displayed on the display 180 may be a Two-Dimensional (2D) or Three-Dimensional (3D) still or moving image.

The controller 170 recognizes the position of the user based on an image captured by a camera unit. For example, a distance (z-axis coordinate) between the user and the image display apparatus 100 may be detected. An x-axis coordinate and a y-axis coordinate in the image display apparatus 100 corresponding to the position of the user may be detected.

A channel browsing processor for generating a thumbnail image corresponding to a channel signal or an external input signal may be further included. The channel browsing processor may receive the stream signal TS output from the demodulator 120 or the stream signal output from the external device interface 130, extract an image from the received stream signal, and generate a thumbnail image. The generated thumbnail image may be decoded into a stream form to be input to the controller 170 together with the decoded image. The controller 170 may display a thumbnail list including a plurality of thumbnail images on the display 180 using the input thumbnail image.

The thumbnail list may be displayed in a brief viewing method of displaying the thumbnail list in a part of an area in a state of displaying a predetermined image or may be displayed in a full viewing method of displaying the thumbnail list in a full area. The thumbnail images in the thumbnail list may be sequentially updated.

The display 180 converts the video signal, the data signal, the OSD signal and the control signal processed by the controller 170 or the video signal, the data signal and the control signal received by the external device interface 130 and generates a drive signal.

The display 180 may be a Plasma Display Panel (PDP), a Liquid Crystal Display (LCD), an Organic Light-Emitting Diode (OLED) display or a flexible display. In particular, the display 180 may be a 3D display.

For viewing a 3D image, the display 180 may be divided into a supplementary display method and a single display method.

In the single display method, a 3D image is implemented on the display 180 without a separate subsidiary device, for example, glasses. The single display method may include, for example, a lenticular method, a parallax barrier, or the like.

In the supplementary display method, a 3D image is implemented on the display 180 using a subsidiary device as a viewing device. The supplementary display method includes various methods such as a Head-Mounted Display (HMD) method or a glasses method.

The glasses method may be divided into a passive method such as a polarized glasses method and an active method such as a shutter glasses method. The HMD method may be divided into a passive method and an active method.

The viewing device may be 3D glasses capable of enabling a user to view a 3D image. The 3D glasses may include passive type polarized glasses, active type shutter glasses or HMD type glasses.

The viewing device may be glasses capable of enabling users to view different images. For example, a first viewing device may enable a user to view only a first image and a second viewing device may enable a user to view only a second image.

If the display 180 is a touchscreen, the display 180 may function as not only an output device but also as an input device.

The audio output unit 185 receives the audio signal processed by the controller 170 and outputs the received audio signal as sound.

The camera unit captures images of a user. The camera unit may be implemented by one camera, but the invention is not limited thereto. That is, the camera unit may be implemented by a plurality of cameras. The camera unit may be embedded in the image display apparatus 100 at the upper side of the display 180 or may be separately provided. Image information captured by the camera unit may be input to the controller 170.

The controller 170 may sense a user gesture from an image captured by the camera unit, a signal sensed by the sensor unit, or a combination of the captured image and the sensed signal.

The remote controller 200 transmits user input to the user input interface 150. For transmission of user input, the remote controller 200 may use various communication techniques such as IR communication, RF communication, Bluetooth, Ultra Wideband (UWB) and ZigBee. In addition, the remote controller 200 may receive a video signal, an audio signal or a data signal from the user input interface 150 and output the received signals visually or audibly.

The above-described image display apparatus 100 may be a fixed or mobile digital broadcast receiver capable of receiving a digital broadcast.

The block diagram of the image display apparatus 100 illustrated in FIG. 3 is only by example. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the invention and thus specific operations or devices should not be construed as limiting the scope and spirit of the invention.

Unlike FIG. 3, the image display apparatus 100 may not include the tuner unit 110 and the demodulator 120 shown in FIG. 3 and may receive broadcast content via the network interface 135 or the external device interface 135 and play back the broadcast content.

Figure 4:
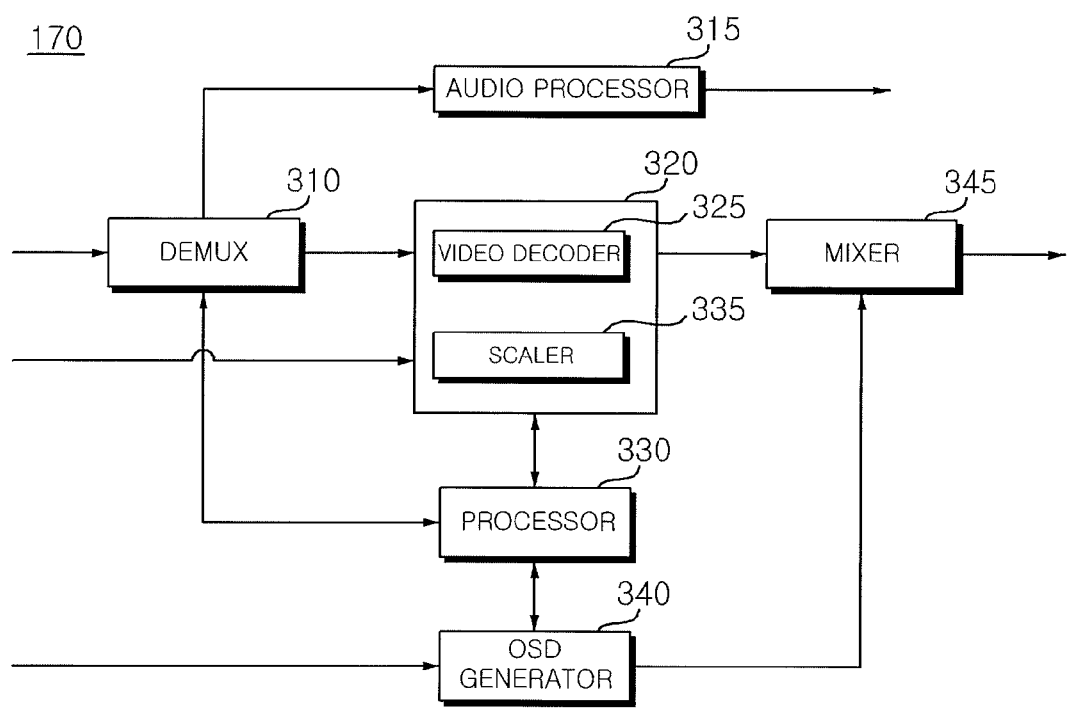
FIG. 4 is a block diagram showing an example of a controller of FIG. 3.

FIG. 4 is a block diagram showing the internal configuration of the controller illustrated in FIG. 3.

Referring to FIG. 4, the controller 170 according to the embodiment of the invention may include a DEMUX 310, an audio processor 315, a video processor 320, a processor 330, an OSD generator 340 and a mixer 345. The controller 170 may further include a data processor.

The DEMUX 310 demultiplexes an input stream. For example, the DEMUX 310 may demultiplex an MPEG-2 TS into a video signal, an audio signal, and a data signal. The stream signal input to the DEMUX 310 may be received from the tuner unit 110, the demodulator 120 or the external device interface 135.

The audio processor 315 may process the demultiplexed audio signal. For audio processing, the audio processor 315 may include various decoders. For efficient transmission of the audio data to the mobile terminal 600, the audio processor 315 may further include an encoder.

In the wireless audio transmission mode of the image display apparatus 100 according to the embodiment of the invention, the audio data transmitted to the mobile terminal 600 may be 1) audio data which is demultiplexed by the DEMUX 310 and is not decoded by the audio processor 315, 2) audio data which is demultiplexed by the DEMUX 310, is decoded by the audio processor 315 and is encoded for transmission to the mobile terminal 600 or 3) audio data which is demultiplexed by the DEMUX 310 and is decoded by the audio processor 315.

In the instance of the audio data of 1), although a time for acquiring the audio data to be transmitted to the mobile terminal 600 is short, since the audio data is not decoded, the mobile terminal 600 which receives the audio data may not decode the audio data if the mobile terminal does not include the decoder.

In the instance of the audio data of 2), since the decoded audio data, that is, the uncompressed audio data, is encoded, it is possible to improve transmission efficiency when wirelessly transmitting the audio data to the mobile terminal 600 and to encode the audio data in consideration of the decoder included in the mobile terminal. However, since the image display apparatus 100 performs demultiplexing, decoding and encoding, it is difficult to perform synchronization between the image display apparatus and the mobile terminal.

In the instance of the audio of 3), since the demultiplexed audio data is decoded, the mobile terminal 600 may receive the uncompressed audio data. Accordingly, the mobile terminal 600 may immediately play back the audio data without performing a separate decoding step. Upon wireless transmission between the image display apparatus 100 and the mobile terminal 600, the amount of wireless data to be transmitted is increased and thus a wide frequency bandwidth is necessary for a wireless channel.

In the embodiment of the invention, any one of the audio data of 1) to 3) is adaptively transmitted according to a wireless channel environment or playback delay information of the mobile terminal, which will be described with reference to FIG. 20 and subsequent figures thereof.

The audio processor 315 may also adjust the bass, treble or volume of the audio signal.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The processor 330 may control the overall operation of the image display apparatus 100 or the controller 170. For example, the processor 330 controls the tuner unit 110 to tune to an RF signal corresponding to a channel selected by the user or a previously stored channel.

The processor 330 may control the image display apparatus 100 by a user command input through the user input interface 150 or an internal program.

The processor 330 may control data transmission of the network interface 135 or the external device interface 130.

The processor 330 may control the operation of the DEMUX 310, the video processor 320 and the OSD generator 340 of the controller 170.

The OSD generator 340 generates an OSD signal autonomously or according to user input. For example, the OSD generator 340 may generate signals by which a variety of information is displayed as graphics or text on the display 180, according to user input signals. The OSD signal may include various data such as a User Interface (UI), a variety of menus, widgets, icons, etc. Also, the OSD signal may include a 2D object and/or a 3D object.

The OSD generator 340 may generate a pointer which can be displayed on the display according to a pointing device received from the remote controller 200. In particular, such a pointer may be generated by a pointing signal processor and the OSD generator 340 may include such a pointing signal processor. Alternatively, the pointing signal processor may be provided separately from the OSD generator 340.

The mixer 345 may mix the decoded video signal processed by the video processor 320 with the OSD signal generated by the OSD generator 340.

The data processor of the controller 170 may process the demultiplexed data signal. For example, if the demultiplexed data signal was encoded, the data processor may decode the data signal. The encoded data signal may be Electronic Program Guide (EPG) information including broadcasting information such as the start time and end time of broadcast programs of each channel.

The block diagram of the controller 170 shown in FIG. 4 is by example. The components of the block diagrams may be integrated or omitted, or a new component may be added according to the specifications of the controller 170.

Figure 5:
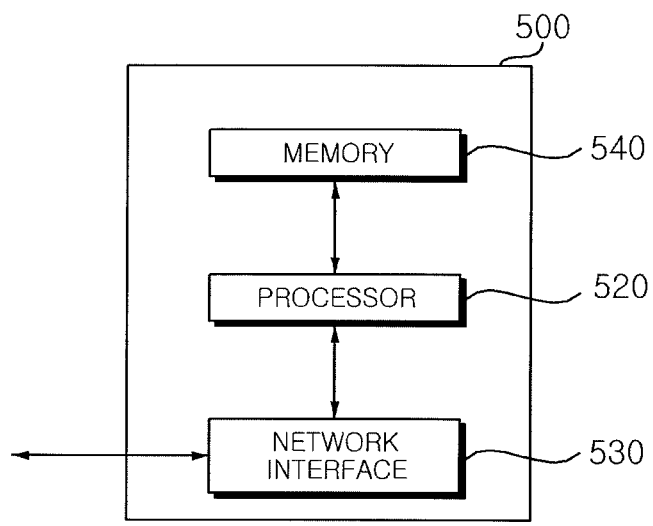
FIG. 5 is a block diagram showing the internal configuration of a wireless router of FIG. 1.

FIG. 5 is a block diagram showing the internal configuration of the wireless router of FIG. 1.

Referring to FIG. 5, the network router 500 may include a network interface 530, a memory 540 and a processor 520.

The network interface 530 may exchange data with the image display apparatus 100 or the mobile terminal 600.

More specifically, in a wireless audio transmission mode, for synchronization with the mobile terminal 600, the network interface 530 may receive TCP packet based control data from the mobile terminal 600, transmit the TCP packet based control data to the image display apparatus 100, receive TCP packet based feedback data from the image display apparatus 100 and transmit the TCP packet based feedback data to the mobile terminal 600.

Next, if synchronization is completed, the network interface 530 may receive RTP/UDP packet based audio data from the image display apparatus 100 and transmit RTP/UDP packet based audio data to the mobile terminal 600, for wireless audio data transmission to the mobile terminal 600.

The memory 540 may store an external IP address and internally allocated virtual IP addresses for providing a wireless network and wireless channel names, frequency ranges and security information corresponding to the virtual IP addresses. The memory 540 may store the name of the image display apparatus 100 and the name of the mobile terminal 600 connected to the network via the network router 500.

The processor 520 controls the overall operation of the network router 500.

As described above, for wireless audio transmission/reception mode, the processor may control data exchange between the image display apparatus 100 and the mobile terminal 600. If an electronic apparatus is added to the network, the processor may additionally allocate a virtual IP address and a wireless channel to the electronic apparatus. The processor may provide wireless channel environment information to the image display apparatus 100 and the mobile terminal 600. For example, the processor may provide security information, channel name information, signal intensity information, etc., of the wireless channel.

Figure 6:
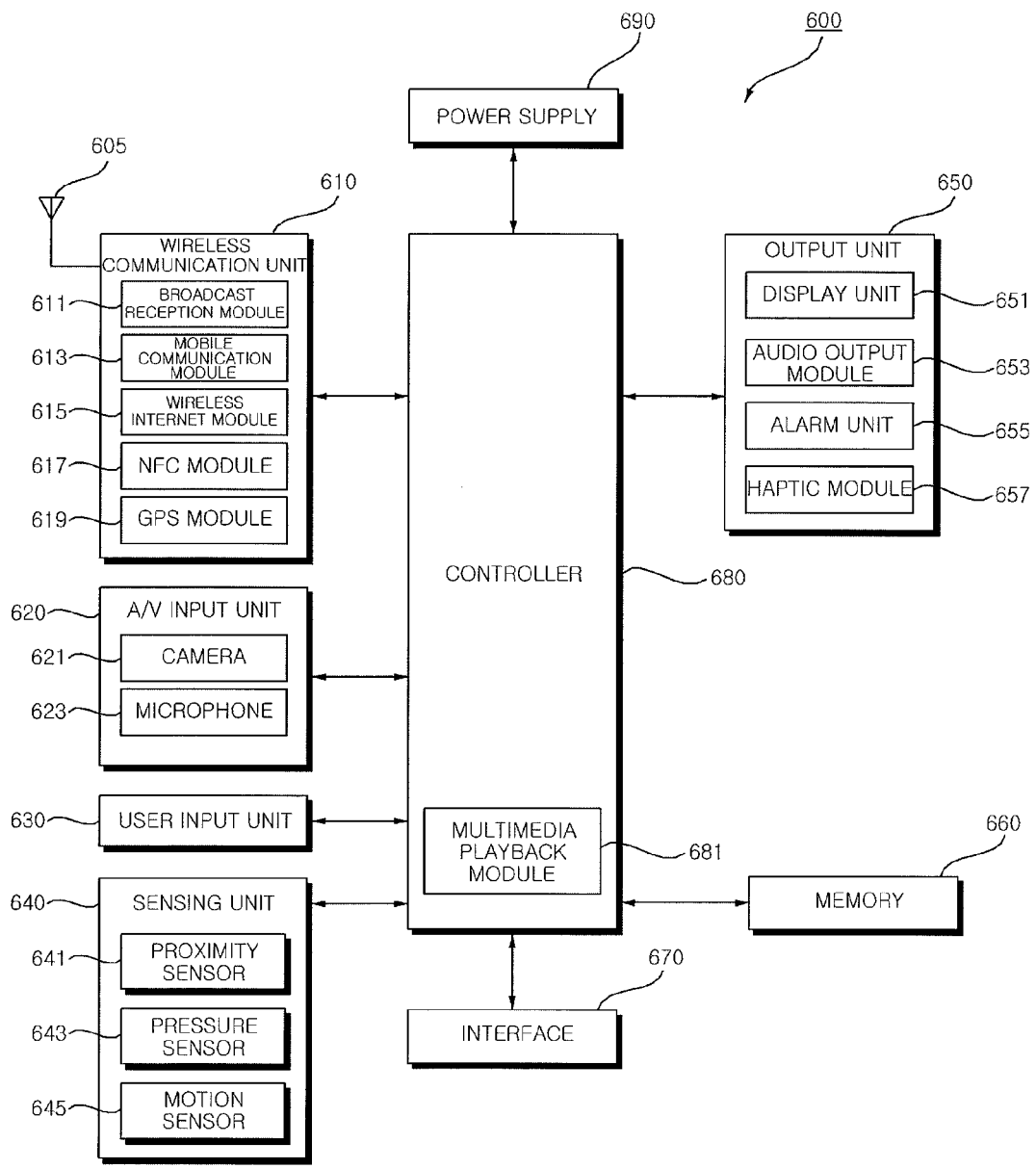
FIG. 6 is a block diagram showing the internal configuration of a mobile terminal of FIG. 1.

FIG. 6 is a block diagram showing the internal configuration of the mobile terminal of FIG. 1.

Referring to FIG. 6, the mobile terminal 600 may include a wireless communication unit 610, an audio/video (A/V) input unit 620, a user input unit 630, a sensing unit 640, an output unit 650, a memory unit 660, an interface unit 670, a controller 680 and a power supply 690.

The wireless communication unit 610 according to the embodiment of the invention may transmit TCP packet based control data to the image display apparatus 100 via the wireless router 500 and receive TCP packet based feedback data from the image display apparatus 100 via the wireless router 500, for synchronization with the image display apparatus 100 in a wireless audio reception mode.

The wireless communication unit 610 may receive RTP/UDP packet based audio data from the image display apparatus 100 via the wireless router 500, for a wireless audio reception mode if synchronization is completed.

The wireless communication unit 610 may include a broadcast reception module 611, a mobile communication module 613, a wireless Internet module 615, an NFC module 617, and a global positioning system (GPS) module 619.

The broadcast reception module 611 receives at least one of a broadcast signal and broadcast-related information from an external broadcast management server through a broadcast channel. The broadcast channel may include a satellite channel and a terrestrial channel.

The broadcast signal and/or the broadcast-related information received through the broadcast reception module 611 may be stored in the memory 660.

The mobile communication module 613 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 615 is an internal or external module for wireless Internet access which may be provided to the mobile terminal 600. For example, the wireless Internet module 615 may perform WiFi based wireless communication or WiFi Direct based wireless communication.

The NFC module 617 may perform NFC. The NFC module 617 may receive or transmit data from or to an electronic apparatus including an NFC tag or an NFC module mounted therein if the electronic apparatus approaches the mobile terminal 600 within a predetermined distance, that is, if the electronic device is tagged.

As short-range wireless communication technology, Bluetooth, Radio-Frequency IDentification (RFID), Infrared Data Association (IrDA), Ultra WideBand (UWB), and ZigBee may be used.

The GPS module 619 may receive position information from a plurality of GPS satellites.

The A/V input unit 610 receives an audio signal or a video signal and may include a camera 621 and a microphone 623.

The user input unit 630 generates key input data enabling the user to control the operation of the terminal. The user input unit 630 may include a keypad, a dome switch, a touchpad (static pressure/static electrical), etc. In particular, if the touchpad and the display 651 have a layered structure, it may be called a touchscreen.

The sensing unit 640 detects a current state of the mobile terminal 600 such as whether the mobile terminal 600 is opened or closed, the position of the mobile terminal 600 and contact/non-contact thereof by a user and generates a sensing signal for controlling the operation of the mobile terminal 600.

The sensing unit 640 may include a proximity sensor 641, a pressure sensor 643 and a motion sensor 645. The motion sensor 645 may sense motion or position of the mobile terminal 600 using an acceleration sensor, a gyroscopic sensor and a gravity sensor. In particular, the gyroscopic sensor measures an angular speed and senses a direction (angle) in which the mobile terminal rotates from a reference direction.

The output unit 650 may include a display 651, an audio output module 653, an alarm unit 655 and a haptic module 657.

The display 651 displays information processed by the mobile terminal 600.

As described above, if the display 651 and the touchpad have the layered structure to configure the touchscreen, the display 651 can be used not only as an output device but also as an input device for inputting information via user touch.

The audio output module 653 may output audio data received from the wireless communication module 610 or stored in the memory 660. The audio output module 653 may include a speaker, a buzzer, etc.

The alarm unit 655 outputs a signal notifying the user that an event has occurred in the mobile terminal 600.

The haptic module 657 generates a variety of tactile effects that the user can feel. A typical example of the tactile effect generated by the haptic module 657 is vibration.

The memory 660 may store a program for processing and control of the controller 680 and may temporarily store input or output data (for example, a phonebook, messages, audio, still images, and moving images).

The interface 670 serves as an interface with all external devices connected to the mobile terminal 600. The interface 670 may receive data from an external device or receive power and transmit power to the components of the mobile terminal 600 or transmit data of the mobile terminal 600 to an external device.

The controller 680 controls the overall operation of the mobile terminal 600. For example, the controller 680 performs control and processing associated with voice communication, data communication, video communication, and the like. The controller 680 may include a multimedia playback module 681 for multimedia playback. The multimedia playback module 681 may be implemented in the controller 680 in hardware form or may be implemented in software form separately from the controller 680. The operation of the controller 680 for multimedia playback will be described below with reference to FIG. 11 and subsequent figures thereof.

The power supply 690 receives external power or internal power and supplies power required for operation to each component under control of the controller 680.

The block diagram of the mobile terminal 600 shown in FIG. 6 is only by example. Depending upon the specifications of the mobile terminal 600 in actual implementation, the components of the mobile terminal 600 may be combined or omitted or new components may be added. That is, two or more components may be incorporated into one component or one component may be configured as separate components, as needed. In addition, the function of each block is described for the purpose of describing the embodiment of the invention and thus specific operations or devices should not be construed as limiting the scope and spirit of the invention.

Figure 7:
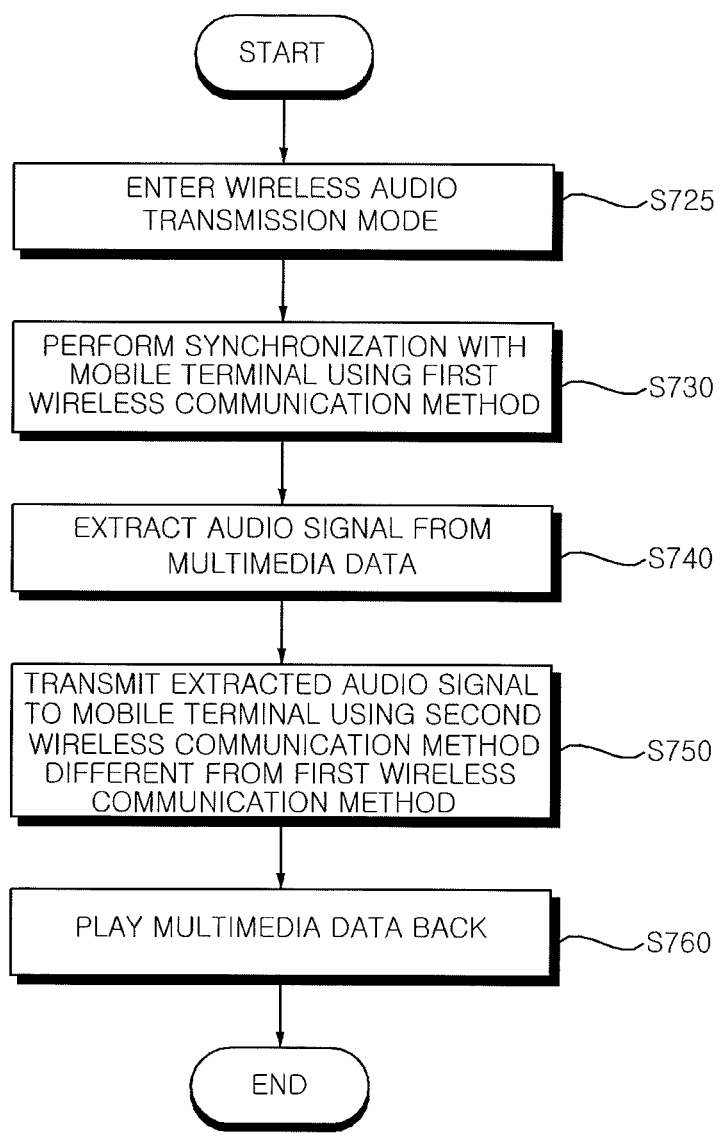
FIG. 7 is a flowchart illustrating a method for operating an image display apparatus according to an embodiment of the invention.

FIG. 7 is a flowchart illustrating a method for operating an image display apparatus according to an embodiment of the invention.

Referring to FIG. 7, first, the image display apparatus 100 enters a wireless audio transmission mode when receiving a wireless audio reception mode entrance signal from the mobile terminal (S725). Then, synchronization with the mobile terminal 600 is performed using a first wireless communication method (S730).

The network interface 135 of the image display apparatus 100 may receive a TCP packet including a wireless audio transmission mode start signal via the wireless router 500. In the embodiment of the invention, in order to secure data communication reliability, a TCP based communication method may be employed as the first wireless communication method.

The controller 170 of the image display apparatus 100 may control entrance into the wireless audio transmission mode if the wireless audio transmission mode start signal in the TCP packet is received. Then, the controller 170 may control the image display apparatus to perform synchronization with the mobile terminal 600.

More specifically, the controller 170 of the image display apparatus 100 may control transmission of information about the number of channels of audio data to be transmitted, encoding state information, encoding scheme information, etc., as feedback data in the form of the TCP packet in correspondence with the received wireless audio transmission mode start signal.

The information about the number of channels indicates information indicating whether the channel of audio data to be transmitted is a mono channel, a stereo channel or a 5.1 channel.

The encoding state information may indicate whether audio data to be transmitted is 1) audio data which is demultiplexed by the DEMUX 310 and is not decoded by the audio processor 315, 2) audio data which is demultiplexed by the DEMUX 310, is decoded by the audio processor 315 and is encoded for transmission to the mobile terminal 600 or 3) audio data which is demultiplexed by the DEMUX 310 and is decoded by the audio processor 315.

The encoding scheme information is valid when the encoding state information indicates encoded audio data and may indicate whether an encoding scheme is an AC3 encoding scheme or an AAC encoding scheme.

For example, if the image display apparatus 100 receives the wireless audio transmission mode start signal in a state of playing back a broadcast image of a specific channel as multimedia data, the controller 170 of the image display apparatus 100 controls transmission of AAC as encoding scheme information if the encoding scheme of audio data to be transmitted is an AAC encoding scheme and controls transmission of a stereo channel as information about the number of channels if the number of channels is 2.

Next, the network interface 135 of the image display apparatus 100 may receive a TCP packet including synchronization completion information indicating that synchronization with the mobile terminal 600 is completed. Then, synchronization between the image display apparatus 100 and the mobile terminal 600 is completed. That is, preparation for audio data transmission is completed in the wireless audio transmission mode.

Next, the image display apparatus 100 extracts an audio signal from multimedia data (S740). The extracted audio signal is transmitted to the mobile terminal using a second communication method (S750).

After synchronization is completed, the controller 170 of the image display apparatus 100 extracts an audio signal to be transmitted. For example, if the multimedia data is a broadcast signal, the controller 170 and, more particularly, the DEMUX 310 of the image display apparatus may demultiplex a broadcast stream into an audio signal, a video signal and a data signal.

In the wireless audio transmission mode according to the embodiment of the invention, the audio data transmitted to the mobile terminal 600 may be 1) audio data which is demultiplexed by the DEMUX 310 and is not decoded by the audio processor 315, 2) audio data which is demultiplexed by the DEMUX 310, is decoded by the audio processor 315 and is encoded for transmission to the mobile terminal 600 or 3) audio data which is demultiplexed by the DEMUX 310 and is decoded by the audio processor 315.

The controller 170 of the image display apparatus 100 may control selection of any one of the audio signal of 1) to 3) and transmission of the selected audio signal to the mobile terminal 600 in the form of a one-way multicast RTP/UDP packet.

In the embodiment of the invention, for low-delay streaming of audio data and multi-user support, a real time transmission protocol (RTP)/user datagram protocol (UDP) based communication method may be employed as the second wireless communication method.

Next, the image display apparatus 100 plays back the multimedia data (S760). In particular, the controller 170 of the image display apparatus 100 may decode the video signal among the demultiplexed audio signal, video signal and data signals and output the video signal to be displayed on the display 180. Then, the display 180 may display the broadcast image corresponding to the received broadcast signal. At this time, the audio output unit 185 of the image display apparatus 100 may not output a broadcast audio signal corresponding to the received broadcast signal. That is, the audio output unit 185 of the image display apparatus is in a mute mode and thus may not output an audio signal. Thus, other users who do not wish to listen to the audio data need not listen to the audio signal when the image display apparatus 100 plays back the multimedia data.

Figure 8:
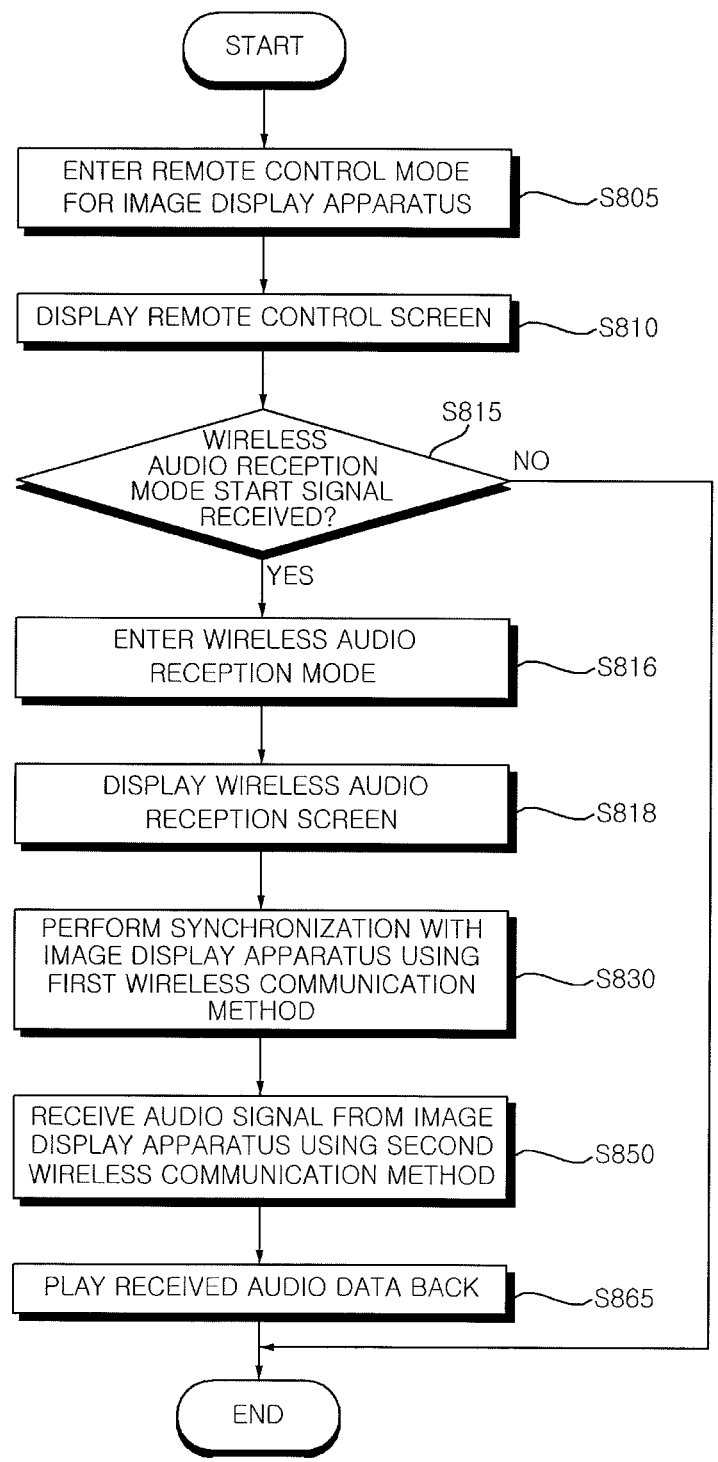
FIG. 8 is a flowchart illustrating a method for operating a mobile terminal according to an embodiment of the invention.

FIG. 8 is a flowchart illustrating a method for operating a mobile terminal according to an embodiment of the invention.

Referring to FIG. 8, first, the mobile terminal 600 enters a remote control mode for the image display apparatus (S805) and displays a remote control screen (S810). In a state of displaying the remote control screen, it is determined whether a wireless audio reception mode start signal is received (S815) and, if so, the mobile terminal enters the wireless audio reception mode (S816). Then, a wireless audio reception screen is displayed (S818) and synchronization with the image display apparatus is performed using the first wireless communication method (S820).

If a remote control menu item or a remote control application item of the mobile terminal 600 is executed, the controller 680 of the mobile terminal 600 may control entrance of the image display apparatus 100 into the remote control mode. The controller 680 of the mobile terminal 600 may control display of the remote control screen 1310 shown in (a) of FIG. 13 on the display 651.

Figure 13:
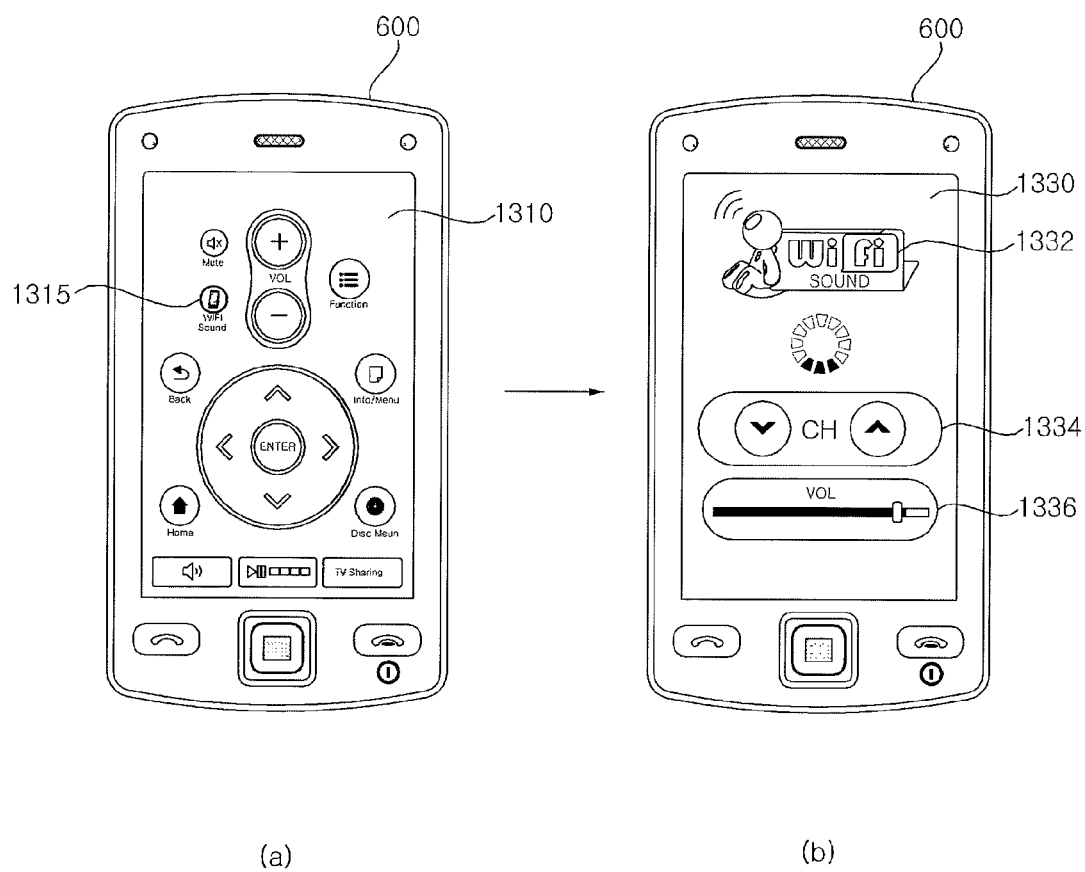

The remote control screen 1310 of (b) of FIG. 13 includes a mute item, a channel control item, a volume control item, a wireless audio reception mode item (WiFi sound) 1315. If a user selects the wireless audio reception mode item (WiFi sound) 1315, the controller 680 of the mobile terminal 600 may determine that the wireless audio reception mode is selected and control display of the wireless audio reception screen indicating the wireless audio reception mode.

(b) of FIG. 13 shows the wireless audio reception screen. A WiFi sound screen 1330 indicating the wireless audio reception mode is displayed on the display 651.

The WiFi sound screen 1330 of (b) of FIG. 13 includes an object (denoted by WiFi sound) 1332 indicating the wireless audio reception mode, a channel control item 1334 and a volume control item 1336.

If the wireless audio reception mode item (WiFi sound) 1315 of the remote control screen 1310 is selected, the controller 680 of the mobile terminal 600 may control transmission of a TCP packet including a wireless audio reception mode start signal to the image display apparatus 100, separately from control of display of the WiFi sound screen 1330, as shown in (b) of FIG. 13. That is, the controller 680 may control synchronization with the image display apparatus 100.

The image display apparatus 100 enters the wireless audio reception mode and performs synchronization with the mobile terminal. That is, the image display apparatus 100 may transmit information about the number of channels of audio data to be transmitted, encoding state information, encoding scheme information, etc., as feedback data in the form of a TCP packet. The controller 680 of the mobile terminal 600 may receive information about the number of channels, encoding state information, encoding scheme information, etc., via the wireless communication unit 610.

The controller 680 of the mobile terminal 600 may control transmission of a TCP packet including synchronization completion information indicating that synchronization with the image display apparatus 100 is completed, if synchronization with the image display apparatus 100 is completed.

Next, the mobile terminal 600 receives an audio signal from the image display apparatus using the second wireless communication method (S850). After synchronization is completed, the image display apparatus 100 may transmit audio data in the form of an RTP/UDP packet and the controller 680 of the mobile terminal 600 receives audio data. The audio data may be 1) non-encoded audio data, 2) encoded audio data or 3) multiplexed and encoded audio data.

Next, the mobile terminal 600 plays back the received audio data (S865). In particular, the controller 680 of the mobile terminal 600 plays back audio data and outputs the played audio data via the audio output module 653, in correspondence with any one of the audio data of 1) to 3).

The user of the mobile terminal 600 may listen to the audio signal output from the mobile terminal 600 while viewing the video of the multimedia data played back (or reproduced) by the image display apparatus 100.

Unlike FIG. 8, even when the remote control screen is not displayed on the mobile terminal 600, the mobile terminal may immediately enter the wireless audio reception mode. For example, the mobile terminal may immediately enter the wireless audio reception mode if a hot key indicating a wireless audio reception mode is manipulated or a wireless audio reception mode app is executed. By manipulation of the hot key or the execution of the app, without displaying the remote control screen, the WiFi sound screen 1330 shown in (b) of FIG. 13 may be immediately displayed on the mobile terminal 600.

Figure 9:
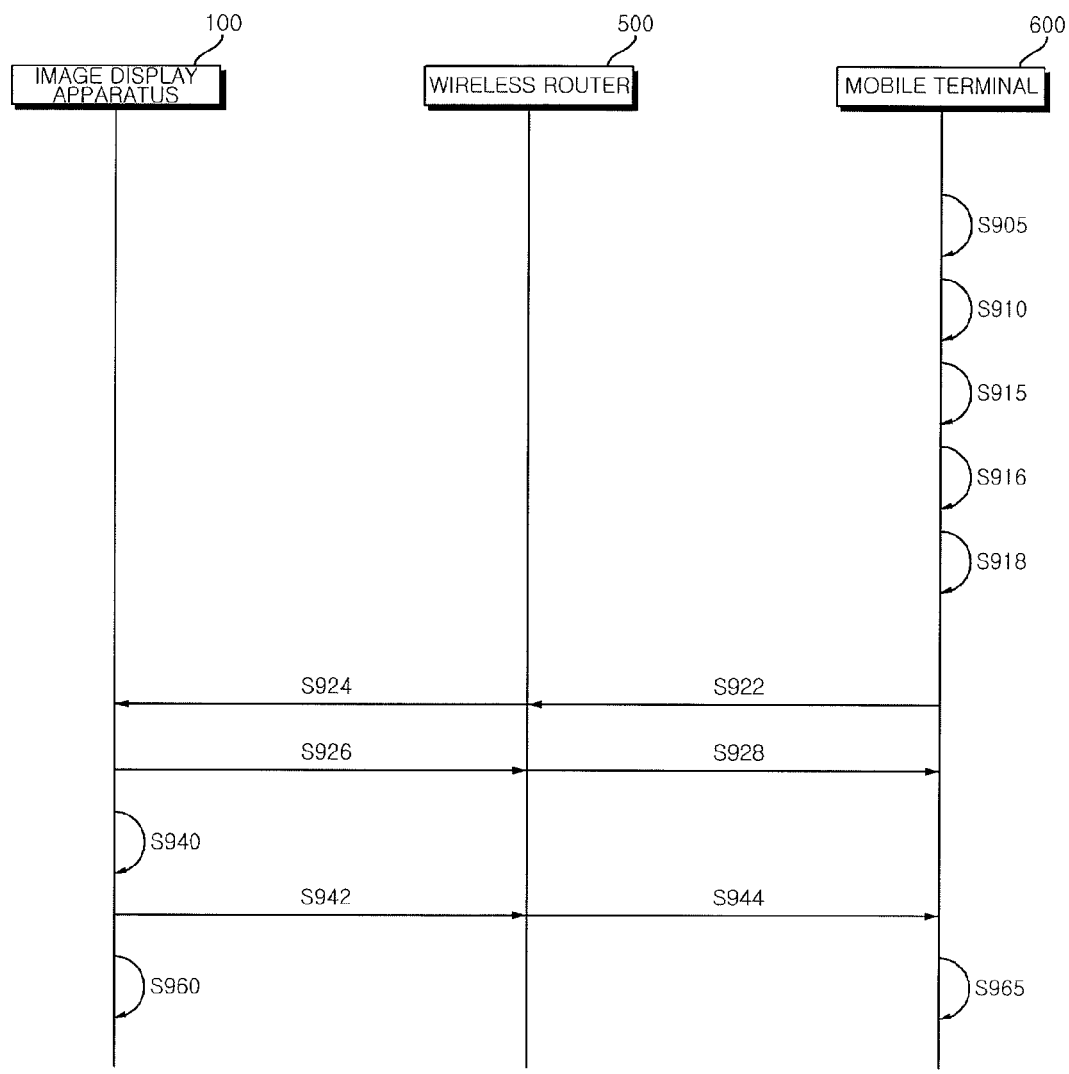
FIG. 9 is a flowchart illustrating an operation of an image display system according to an embodiment of the invention.

FIG. 9 is a flowchart illustrating an operation of an image display system according to an embodiment of the invention.

The operation of the image display system of FIG. 9 corresponds to FIGS. 7 and 8.

More specifically, operations S905 to S918 (S905, S910, S915, S916 and S918) correspond to operations S805 to S818 (S805, S810, S815, S816 and S818) of FIG. 8 and operations S922 to S928 (S922, S924, S926 and S928) correspond to operation S830 of FIG. 8 and operation S730 of FIG. 7.

Operation S940 corresponds to operation S740 of FIG. 7 and operations S942 to S944 (S942 and S944) correspond to operation S750 of FIG. 7 and operation S850 of FIG. 8.

Operation S960 corresponds to operation S760 of FIG. 7 and operation S965 corresponds to operation S865 of FIG. 8.

Figure 10:
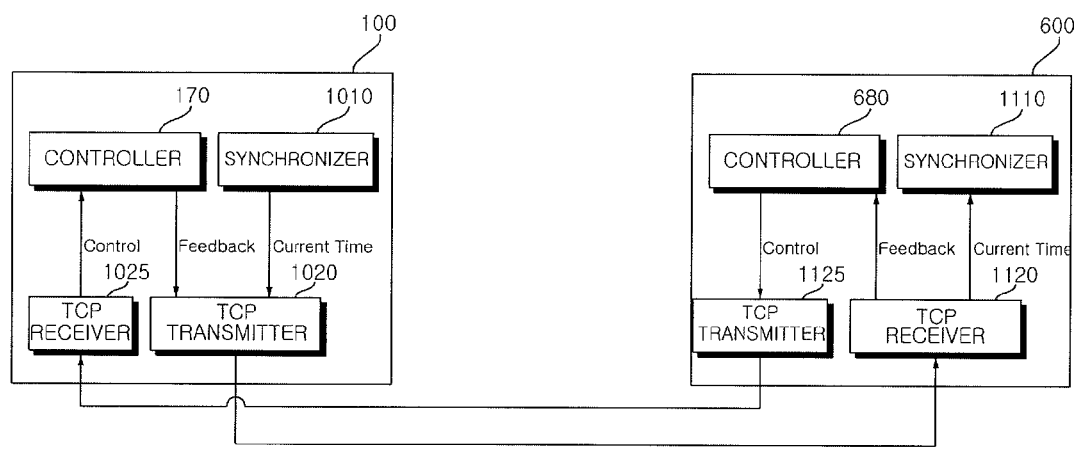
FIGS. 10 to 14 are views referred to for describing various examples of the method for operating the image display apparatus of FIG. 7 or the method for operating the mobile terminal of FIG. 8.

FIG. 10 is a view referred to for describing TCP packet data exchange between the image display apparatus and the mobile terminal.

The controller 680 of the mobile terminal 600 may control transmission of control data via a TCP transmitter 1125. Control data may include at least one of wireless audio reception mode start information or end information, wireless channel setting request information, allocated wireless channel information, decoding information, wireless channel environment information or playback delay information.

Among such control data, during a synchronization process, wireless audio reception mode start information, wireless channel setting request information, allocated wireless channel information, decoding information, etc., may be transmitted to the image display apparatus 100.

Among such control data, during an audio data reception process, wireless audio reception mode end information, wireless channel change request information, wireless channel environment information, playback delay information, etc., may be transmitted to the image display apparatus 100.

The controller 170 of the image display apparatus 100 may receive control data via a TCP receiver 1025. The controller 170 may control transmission of feedback data via the TCP transmitter 1020. Feedback data may include at least one of information about the number of channels of audio data to be transmitted, encoding state information, encoding scheme information, playback point-of-time information, current time information, etc.

Among such control data, during a synchronization process, information about the number of channels of audio data to be transmitted, encoding state information, encoding scheme information, etc., may be transmitted to the mobile terminal 600.

Among such control data, during an audio data transmission process, playback point-of-time information, etc., of audio data to be transmitted may be transmitted to the mobile terminal 600.

In FIG. 10, a synchronizer 1010 of the image display apparatus 100 is provided separately from the controller 170 such that current time information is transmitted to the mobile terminal 600 via a TCP transmitter 1020 separately from feedback data. A synchronizer 1110 of the mobile terminal 600 is provided separately from the controller 680 such that current time information is received via a TCP receiver 1120 together with feedback data.

The current time information may be transmitted in a state of being included in feedback data.

The TCP receiver 1025 and the TCP transmitter 1020 of the image display apparatus 100 may be included in the network interface 135 of FIG. 3. The TCP receiver 1120 and the TCP transmitter 1125 of the mobile terminal 600 may be included in the wireless communication unit 610 of FIG. 6.

Figure 11:
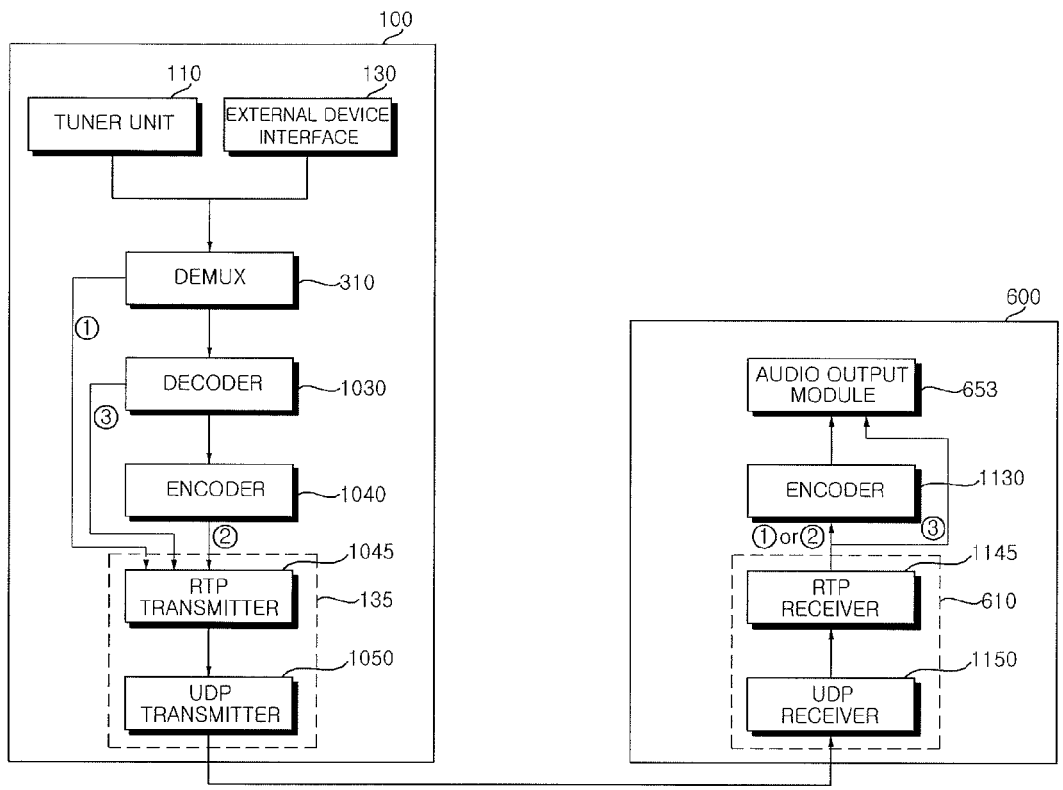
Figure 12:
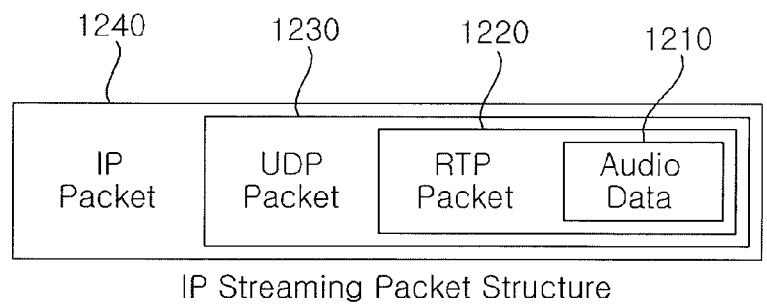

FIG. 11 is a view referred to for describing RTP/UDP packet data exchange between the image display apparatus and the mobile terminal and FIG. 12 schematically shows the structure of RTP/UDP packet data.

The image display apparatus 100 may receive multimedia data from the tuner unit 110, the external device interface 130 or the network interface 135.

In the case of stream data, the DEMUX 310 demultiplexes stream data, a decoder 1030 decodes audio data, and an encoder 1040 encodes the decoded audio data. The DEMUX 310, the decoder 1030 and the encoder 1040 may be included in the controller 170.

Audio data transmittable to the mobile terminal 600 may be ① audio data which is demultiplexed by the DEMUX 310 and is not decoded by the decoder 1030, ② audio data which is demultiplexed by the DEMUX 310, is decoded by the decoder 1030 and is encoded by the encoder 1040 or ③ audio data which is demultiplexed by the DEMUX 310 and is decoded by the decoder 1030.

As shown in FIG. 12, audio data 1210 to be transmitted may be attached with an RTP packet 1220 by an RTP transmitter 1045 of the image display apparatus 100, may be attached with a UDP packet 1230 by a UDP transmitter 1050, and may be transmitted to the mobile terminal 600 as an IP packet 1240.

A UDP receiver 1150 of the mobile terminal 600 separates the UDP packet 1230, the RTP receiver 1145 separates the RTP packet 1220 and supplies the audio data 1210 to an encoder 1130 or an audio output module 653 (more accurately, an audio playback buffer).

If audio data transmitted by the image display apparatus 100 is audio data of ① or ②, since the audio data was encoded, the audio data is decoded by the decoder 1130 and is provided to the audio output module 653.

As another example, if audio data transmitted by the image display apparatus 100 is audio data of ③, since the audio data was decoded, the audio data is provided to the audio output module 653 without being decoded.

The RTP transmitter 1045 and the UDP transmitter 1050 of the image display apparatus 100 may be included in the network interface 135 of FIG. 3. The UDP receiver 1150 and the RTP receiver 1145 of the mobile terminal 600 may be included in the wireless communication unit 610 of FIG. 6.

Figure 14:
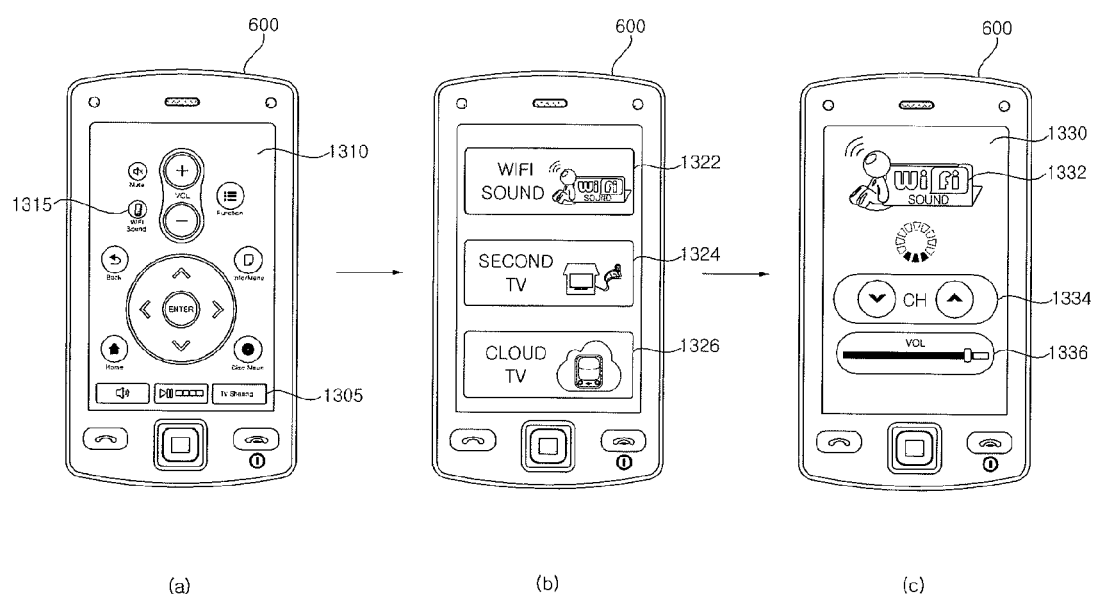

FIG. 14 shows another example of a user interface of the mobile terminal for entering a wireless audio reception mode, similarly to FIG. 13.

Referring to FIG. 14, and unlike FIG. 13, if a "TV sharing" item 1305 of the remote control screen 1310 of (a) of FIG. 14 is selected, as shown in (b) of FIG. 14, a TV sharing screen may be displayed. In FIG. 14, the TV sharing screen includes remote control items such as a WiFi sound item 1322, a second TV item 1324, a cloud TV item 1326, etc.

Among others, if the WiFi sound item 1322 is selected, the controller 680 of the mobile terminal 600 may control display of a WiFi sound screen 1330 as shown (c) of FIG. 14, which shows a wireless audio reception screen similar to that of (b) of FIG. 13. In addition, the controller 680 of the mobile terminal 600 may control transmission of a TCP packet including a wireless audio reception mode start signal to the image display apparatus 100 separately from the WiFi sound screen 1330. That is, the controller 680 may control synchronization with the image display apparatus 100.

Figure 15:
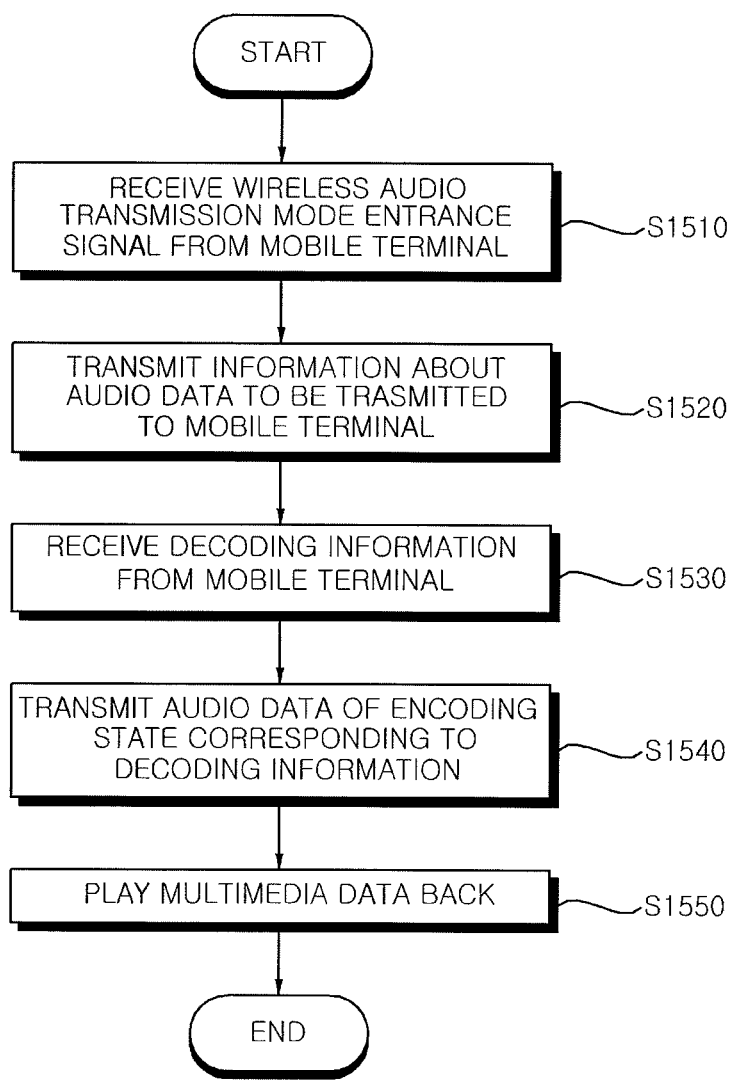
FIG. 15 is a flowchart illustrating a method for operating an image display apparatus according to another embodiment of the invention.

FIG. 15 is a flowchart illustrating a method for operating an image display apparatus according to another embodiment of the invention.

Referring to FIG. 15, the controller 170 of the image display apparatus 100 receives a wireless audio reception mode entrance signal from the mobile terminal 600 (S1510). As described in operation 5710 of FIG. 7, the image display apparatus 100 may receive TCP packet data including a wireless audio transmission mode start signal. The TCP receiver 1025 may separate a TCP packet and send the wireless audio transmission mode start signal to the controller 170 of the image display apparatus 100.

Next, the controller 170 of the image display apparatus 100 transmits information about audio data to be transmitted to the mobile terminal 600 (S1520). For example, the TCP receiver 1020 may transmit a TCP packet including information about the number of channels of audio data to be transmitted, encoding state information, encoding scheme information, etc., to the mobile terminal 600.

Next, the controller 170 of the image display apparatus 100 receives decoding information from the mobile terminal 600 (S1530). Audio data of an encoding state corresponding to the decoding information is transmitted (S1540).

The controller 680 of the mobile terminal 600 may generate decoding information indicating whether audio data to be received by the mobile terminal 600 can be decoded using the encoding scheme information of the received information about the audio data. The decoding information is a flag in which a value of "1" may indicate that audio data can be decoded and a value of "0" may indicate that audio data cannot be decoded.

The controller 170 of the image display apparatus 100 receives the decoding information through the TCP receiver 1020. If audio data can be decoded, the controller 170 maintains the encoding scheme of audio data to be transmitted and transmits the audio data to the mobile terminal 600.

The controller 170 of the image display apparatus 100 changes the encoding method of audio data to be transmitted and transmits the audio data to the mobile terminal 600, if the decoding information indicates that the audio data cannot be decoded.

For example, if the encoding scheme of audio data to be transmitted is an AAC encoding scheme and the mobile terminal 600 cannot perform decoding using such an encoding scheme, the image display apparatus 100 receives information indicating that decoding cannot be performed. The image display apparatus 100 may change the encoding scheme of audio data to be transmitted to an AC3 encoding scheme and transmit the audio data to the mobile terminal 600 again. If the mobile terminal 600 can decode the audio data using the AC3 encoding scheme, information indicating that decoding can be performed may be transmitted to the image display apparatus 100. Thus, the image display apparatus 100 may control transmission of the audio data of the AC3 encoding scheme to the mobile terminal 600.

The encoding scheme may be changed by changing a source of audio data to be transmitted. That is, the encoding scheme may be changed by changing audio data to be transmitted from the audio data of ① of FIG. 11 to the audio data of ③ of FIG. 11.

For example, if the encoding scheme of the audio data of ① is an AAC encoding scheme and the encoding scheme of the encoder 1040 is an AC3 encoding scheme, audio data to be transmitted may be changed from the audio data of ① to the audio data of ③ of FIG. 11.

Next, the image display apparatus plays back multimedia data (S1550). In particular, the controller 170 of the image display apparatus 100 may decode a video signal among the demultiplexed audio signal, video signal and data signal and output the video signal to be displayed on the display 180. Thus, the display 180 may display a broadcast image corresponding to the received broadcast signal. At this time, the audio output unit 185 of the image display apparatus 100 may not output a broadcast audio signal corresponding to the received broadcast signal.

Figure 16:
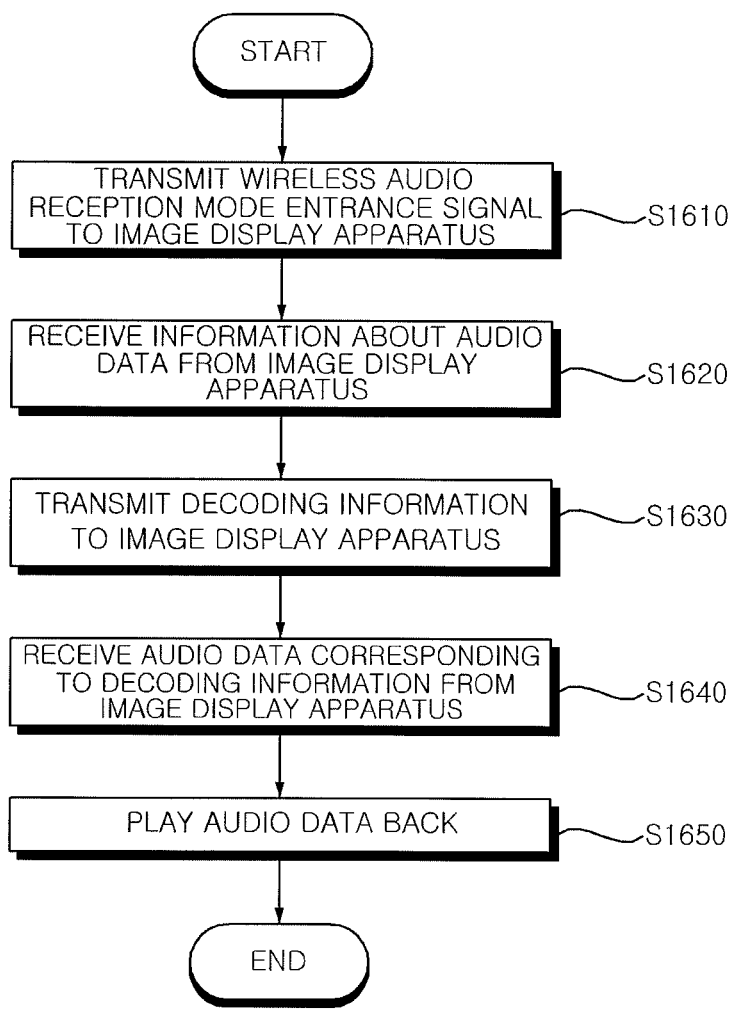
FIG. 16 is a flowchart illustrating a method for operating a mobile terminal according to another embodiment of the invention.
Figure 17:
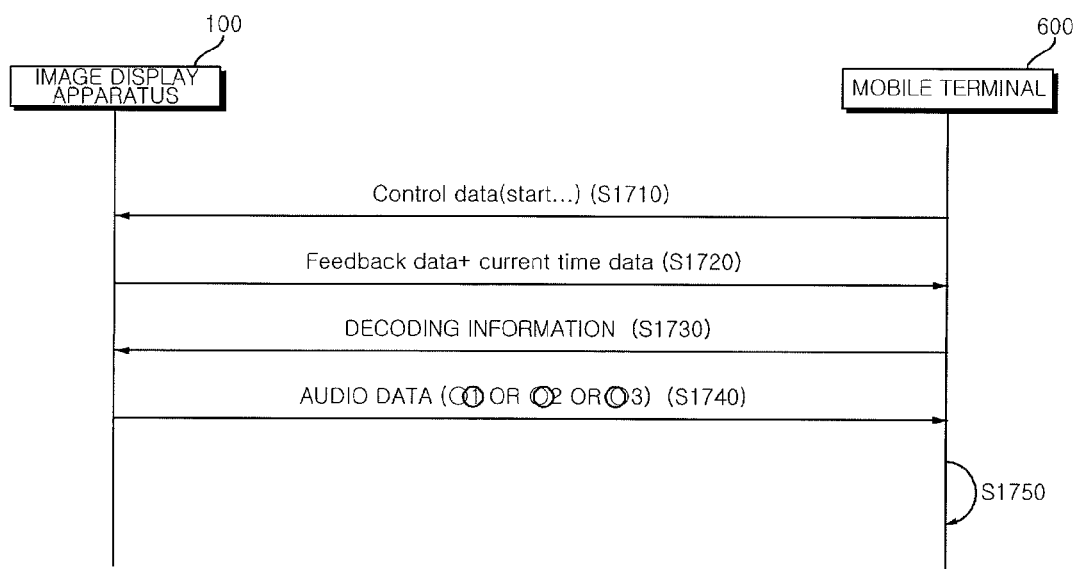
FIGS. 17 to 19 are views referred to for describing various examples of the method for operating the image display apparatus of FIG. 15 or the method for operating the mobile terminal of FIG. 16.
Figure 18:
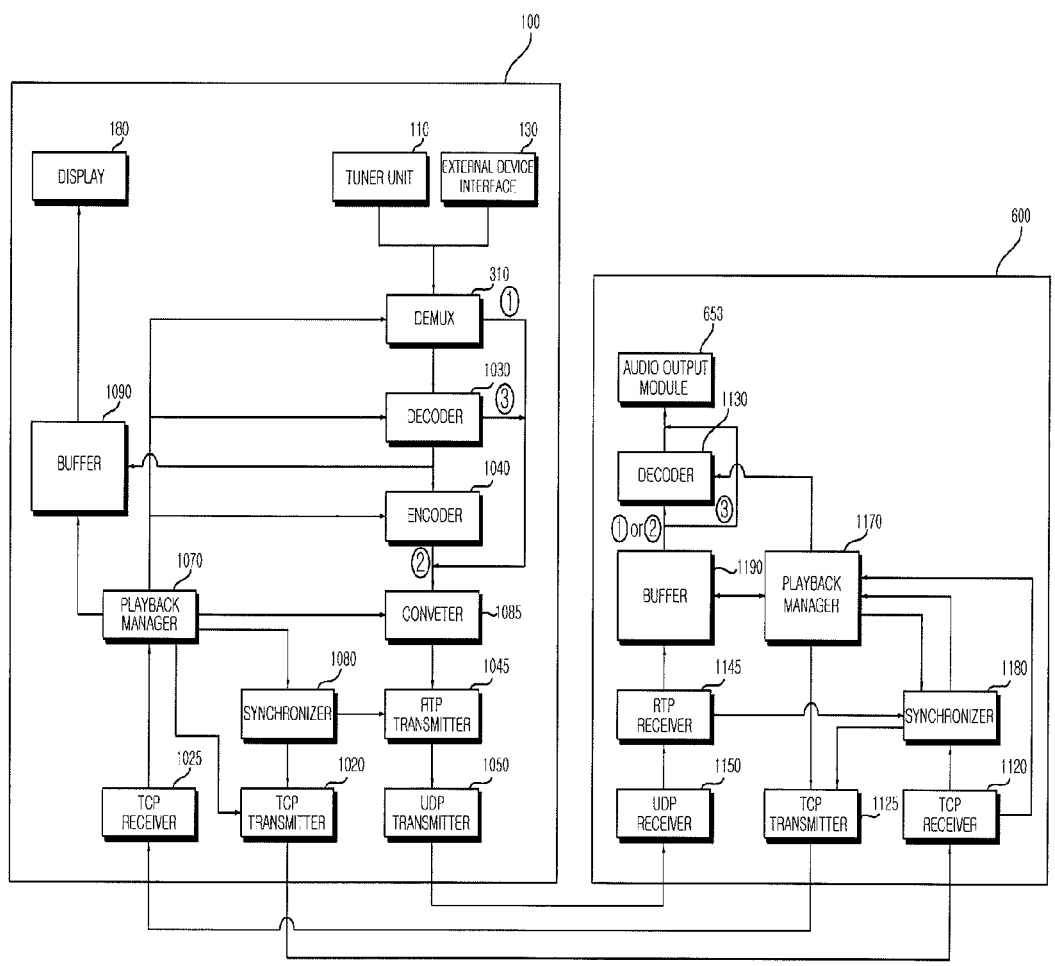
Figure 19:
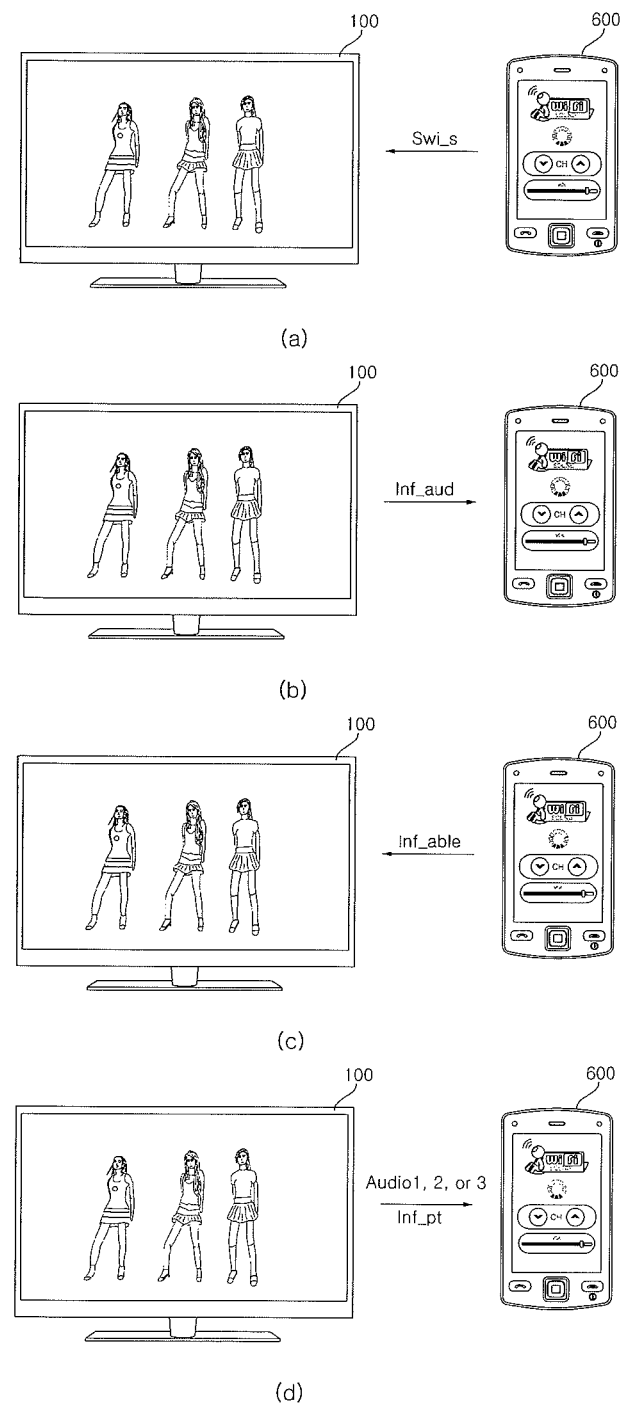

FIG. 16 is a flowchart illustrating a method for operating a mobile terminal according to another embodiment of the invention, and FIGS. 17 to 19 are views referred to for describing various examples of the method for operating the image display apparatus of FIG. 15 or the method for operating the mobile terminal of FIG. 16.

Referring to FIG. 16, the mobile terminal 600 transmits a wireless audio reception mode entrance signal to the image display apparatus 100 (S1610) and receives information about audio data from the image display apparatus 100 (S1620). Operation S1610 corresponds to operation S1710 of FIG. 17 and operation S1620 corresponds to operation S1720 of FIG. 17.

The TCP transmitter 1125 of the mobile terminal 600 may transmit TCP packet data including a wireless audio reception mode start signal to the image display apparatus 100. (a) of FIG. 19 shows transmission of a wireless audio reception mode start signal SWi_s from the mobile terminal 600 to the image display apparatus 100.

The TCP receiver 1025 of the image display apparatus 100 may receive the TCP packet data including the wireless audio reception mode start signal, separate a TCP packet and send the wireless audio reception mode start signal to a playback manager 1070. The playback manager 1070 of the image display apparatus 100 regards the wireless audio reception mode start signal as the wireless audio transmission mode start signal from the viewpoint of the image display apparatus 100.

The playback manager 1070 of the image display apparatus 100 may control transmission of information about audio data to be transmitted to the mobile terminal 600. Thus, the TCP transmitter 1020 of the image display apparatus 100 may transmit the TCP packet including information about the number of channels of audio data to be transmitted, encoding state information, encoding scheme information, etc., to the mobile terminal 600.

(b) of FIG. 19 shows transmission of information Inf_and about audio data to be transmitted from the image display apparatus 100 to the mobile terminal 600.

The TCP receiver 1120 of the mobile terminal 600 may receive TCP packet data including the information about the audio data, separate a TCP packet and send information about the number of channels of audio data to be transmitted, encoding state information, encoding scheme information, etc., to the playback manager 1170.

Next, the mobile terminal 600 transmits decoding information to the image display apparatus 100 (S1630) and receives audio data corresponding to decoding information from the image display apparatus 100 (S1640). The received audio data is played back (S1650). Operation S1630 corresponds to operation S1730 of FIG. 17, operation S1640 corresponds to operation S1740 of FIG. 17, and operation S1650 corresponds to operation S1750 of FIG. 17.

The playback manager 1170 of the mobile terminal 600 may determine whether the decoder 1130 of the mobile terminal 600 can decode audio data to be received based on the received encoding scheme information, etc. The playback manager 1170 of the mobile terminal 600 may control transmission of decoding information indicating whether audio data can be decoded through the TCP transmitter 1125.

(c) of FIG. 19 shows transmission of decoding information Inf_able from the mobile terminal 600 to the image display apparatus 100.

The TCP receiver 1025 of the image display apparatus 100 may receive TCP packet data including decoding information, separate a TCP packet and send the decoding information to the playback manager 1070.

The playback manager 1070 of the image display apparatus 100 may control transmission of audio data corresponding to the received decoding information.

For example, the source of audio data to be transmitted may be changed in correspondence with the received decoding information. That is, the audio data to be transmitted may be changed from the audio data of ① of FIG. 11 to the audio data of ③ of FIG. 11.

For example, if the mobile terminal 600 can perform decoding using an AC3 encoding scheme, the encoding scheme of the audio data of ① is an AAC encoding scheme and the encoding scheme of the encoder 1040 is an AC3 encoding scheme, the playback manager 1070 of the image display apparatus 100 may control a converter 1085 to change the audio data to be transmitted from the audio data of ① into the audio data of ③ of FIG. 11.

The RTP transmitter 1045 and the UDP transmitter 1050 of the image display apparatus 100 may transmit data, to which an RTP packet is attached, and data, to which a UDP packet is attached, to the mobile terminal 600, respectively.

The playback manager 1070 of the image display apparatus 100 may control a synchronizer 1080 such that playback point-of-time information of audio data to be transmitted and current time information are transmitted to the mobile terminal 600. The playback point-of-time information and the current time information are output from the synchronizer 1080. Then, the TCP transmitter 1020 of the image display apparatus 100 may transmit a TCP packet including playback point-of-time information and current time information to the mobile terminal 600.

(d) of FIG. 19 shows transmission of audio data Audio_1, 2 or 3, playback point-of-time information Inf-pt, etc., from the image display apparatus 100 to the mobile terminal 600.

The UDP receiver 1150 and the RTP receiver 1145 of the mobile terminal 600 may respectively separate a UDP packet and an RTP packet such that audio data is sent to a buffer 1190.

The playback manager 1170 of the mobile terminal 600 controls playback of the received audio data.

If the audio data transmitted by the image display apparatus 100 is the audio data of ① or ②, since the audio data was encoded, the audio data is decoded by the decoder 1130 and is provided to the audio output module 653.

As another example, if the audio data transmitted by the image display apparatus 100 is ③, since the audio data was decoded, the audio data is immediately provided to the audio output module 653 without being decoded.

The DEMUX 310, the decoder 1030, the encoder 1040 and the playback manager 1070 of FIG. 18 may be included in the controller 170 of the image display apparatus 100. Among others, the playback manager 1070 may correspond to the processor 330 of FIG. 4. The TCP transmitter 1020, the TCP receiver 1025, the UDP transmitter 1050 and the RTP transmitter 1045 of FIG. 18 may be included in the network interface 135 of FIG. 3. The buffer 1090 may correspond to the memory 140.

The playback manager 1170 of the mobile terminal 600 of FIG. 18 may be included in the controller 680 of the mobile terminal 600. The TCP transmitter 1125, the TCP receiver 1125, the UDP transmitter 1150 and the RTP transmitter 1145 of FIG. 18 may be included in the wireless communication unit 610 of FIG. 3. The buffer 1190 may correspond to the memory 660.

Although the audio signal processed by the RTP receiver 1145 is shown as being output to the decoder 1130 or the audio output module 653 via the buffer 1130 in FIG. 18, if the audio signal processed by the RTP receiver 1145 is an encoded audio signal, the audio signal may be decoded by the decoder 1130 and the decoded audio signal may be stored in the buffer 1190. That is, the buffer 1190 may be interposed between the audio output module 653 and the decoder 1130.

Figure 20:
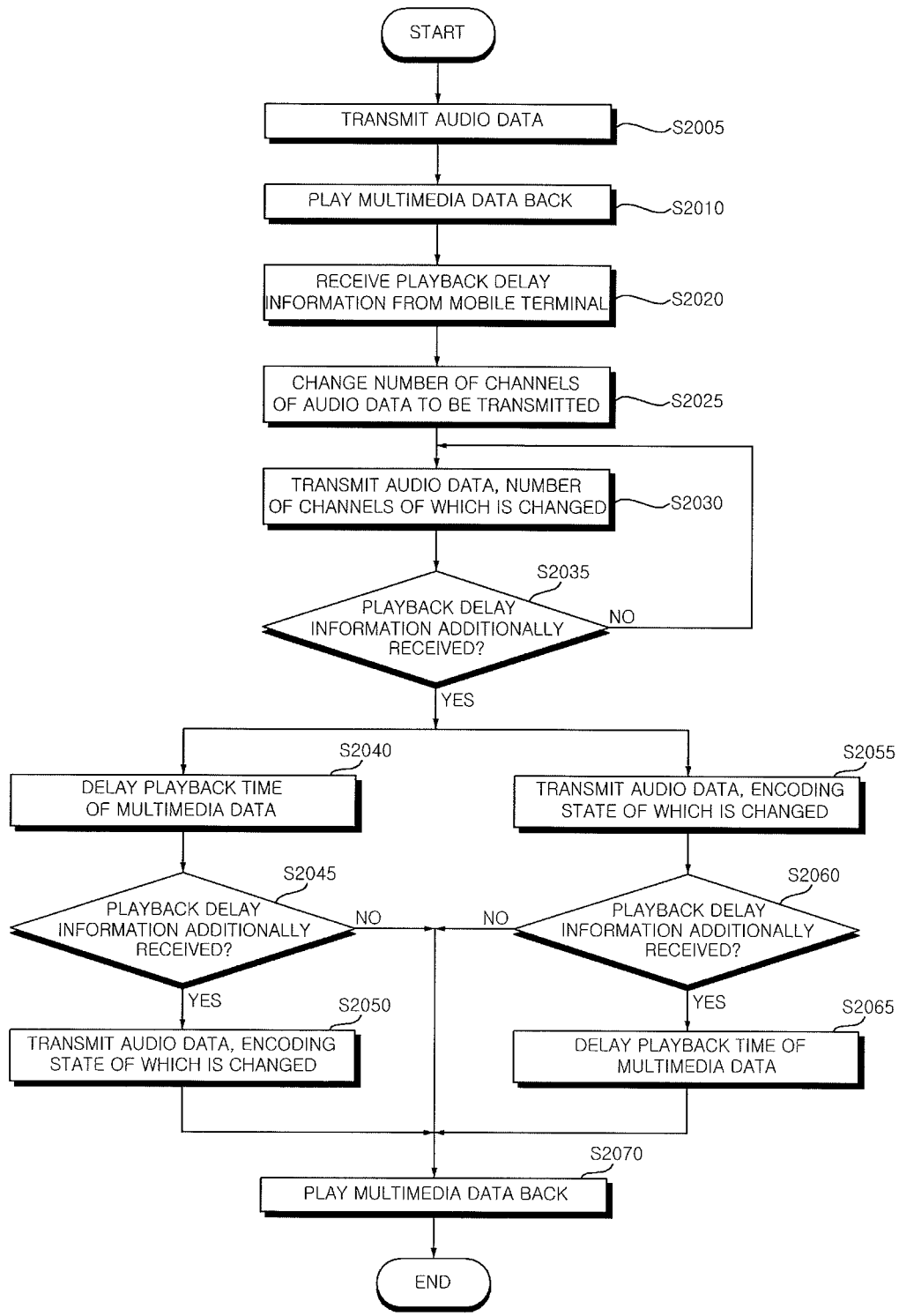
FIG. 20 is a flowchart illustrating a method for operating an image display apparatus according to another embodiment of the invention.
Figure 21:
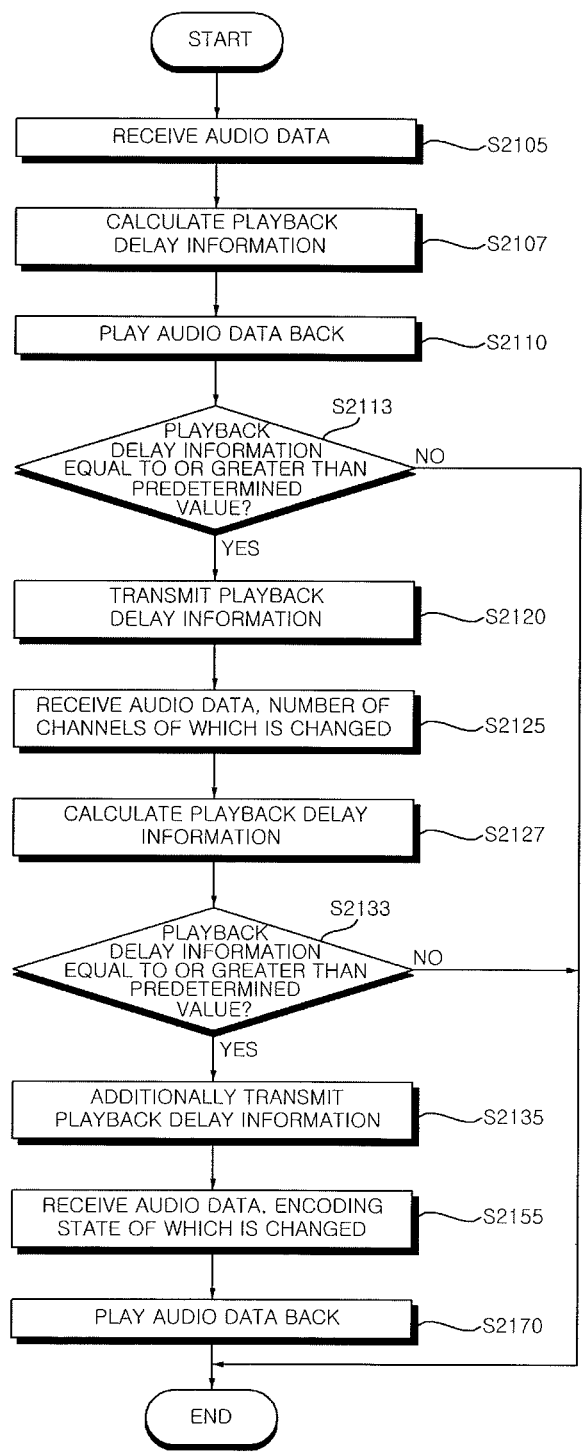
FIG. 21 is a flowchart illustrating a method for operating a mobile terminal according to another embodiment of the invention.

FIG. 20 is a flowchart illustrating a method for operating an image display apparatus according to another embodiment of the invention, FIG. 21 is a flowchart illustrating a method for operating a mobile terminal according to another embodiment of the invention, and FIGS. 22A to 23D are views referred to for describing various examples of the method for operating the image display apparatus of FIG. 20 or the method for operating the mobile terminal of FIG. 21.

Referring to FIG. 20, the image display apparatus 100 transmits audio data to the mobile terminal 600 (S2005). The mobile terminal 600 receives the audio data (S2105).

The RTP transmitter 1045 and the UDP transmitter 1050 of the image display apparatus 100 may transmit an RTP/UDP packet including audio data to the mobile terminal 600. The UDP receiver 1150 and the RTP receiver 1145 of the mobile terminal 600 may respectively separate a UDP packet and an RTP packet such that audio data is sent to the buffer 1190.

Figure 22A:
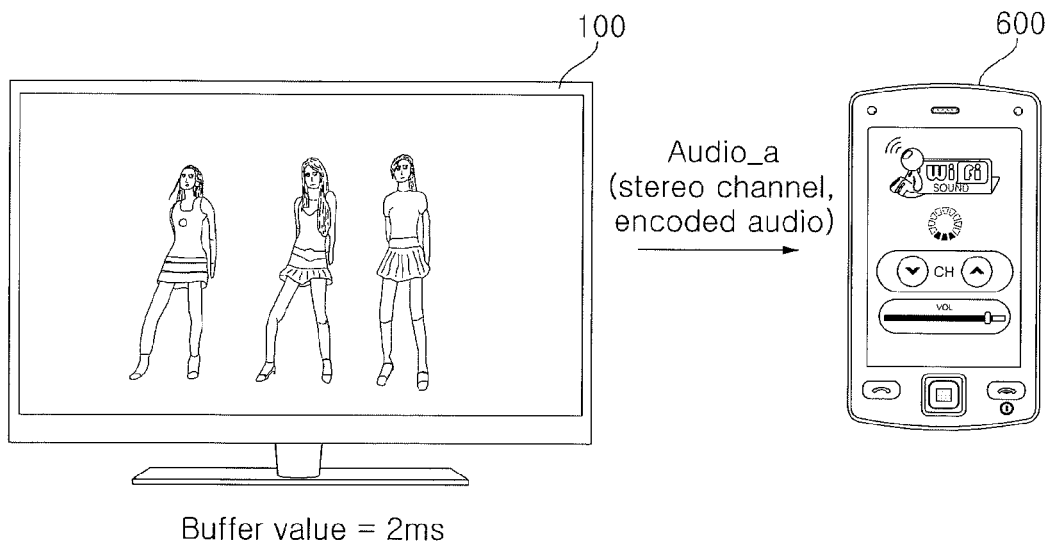
FIGS. 22A to 23D are views referred to for describing various examples of the method for operating the image display apparatus of FIG. 20 or the method for operating the mobile terminal of FIG. 21.

FIG. 22A shows transmission of first audio data Audio_a (stereo channel and encoded audio data) from the image display apparatus 100 to the mobile terminal 600.

The image display apparatus 100 may transmit playback point-of-time information of audio data and current time information to the mobile terminal 600 in addition to the audio data to be transmitted. Such playback point-of-time information and current time information may be output from the synchronizer 1080. Then, the TCP transmitter 1020 of the image display apparatus 100 may transmit a TCP packet including playback point-of-time information, current time information, etc., to the mobile terminal 600.

The TCP receiver 1120 of the mobile terminal 600 may receive TCP packet data including playback point-of-time information and current time information, etc., separate a TCP packet, and send playback point-of-time information and current time information, etc., to the playback manager 1170.

Next, the playback manager 1170 of the mobile terminal 600 calculates playback delay information (S2107). The playback manager 1170 of the mobile terminal 600 may calculate playback delay information of audio data based on audio data received from the image display apparatus, playback point-of-time information and current time and current time information from the synchronizer 1180.

Next, the image display apparatus 100 plays back multimedia data (S2010). Then, the mobile terminal 600 plays back the received audio data (S2110).

The playback manager 1070 of the image display apparatus 100 controls playback of multimedia data, for example, may control provision of the video data decoded by the decoder 1030 to the buffer 1090, control buffering of buffer 1090, and control video playback timing of the multimedia data. The buffer 1090 outputs the received video data to the display 180 according to a set buffering value. In FIG. 22A, the buffering value of the buffer 1090 of the image display apparatus 100 is 2 ms.

The playback manager 1170 of the mobile terminal 600 controls playback of audio data. In FIG. 22A, since the first audio data Audio_a was received, the playback manager 1170 provides the encoded audio data which is temporarily stored in the buffer 1190 to the decoder 1130 and controls the decoder 1130 to decode the encoded audio data. The decoded audio data is provided to the audio output module 653 to be played back.

The playback manager 1170 of the mobile terminal 600 determines whether the playback delay information calculated in operation S2107 is equal to or greater than a predetermined value (S2113) and, if so, controls transmission of the playback delay information to the image display apparatus 100 (S2120). Then, the image display apparatus 100 receives the playback delay information (S2020).

The calculated playback delay information may be transmitted to the image display apparatus 100 via the TCP transmitter 1125. The TCP receiver 1025 of the image display apparatus 100 may transmit playback delay information to the playback manager 1070.

Next, the image display apparatus 100 changes the number of channels of the audio data to be transmitted if the playback delay information is received from the mobile terminal 600 (S2025). The audio data, the number of channels of which is changed, is transmitted to the mobile terminal 600 (S2030). Thus, the mobile terminal 600 receives the audio data, the number of channels of which is changed.

Figure 22B:
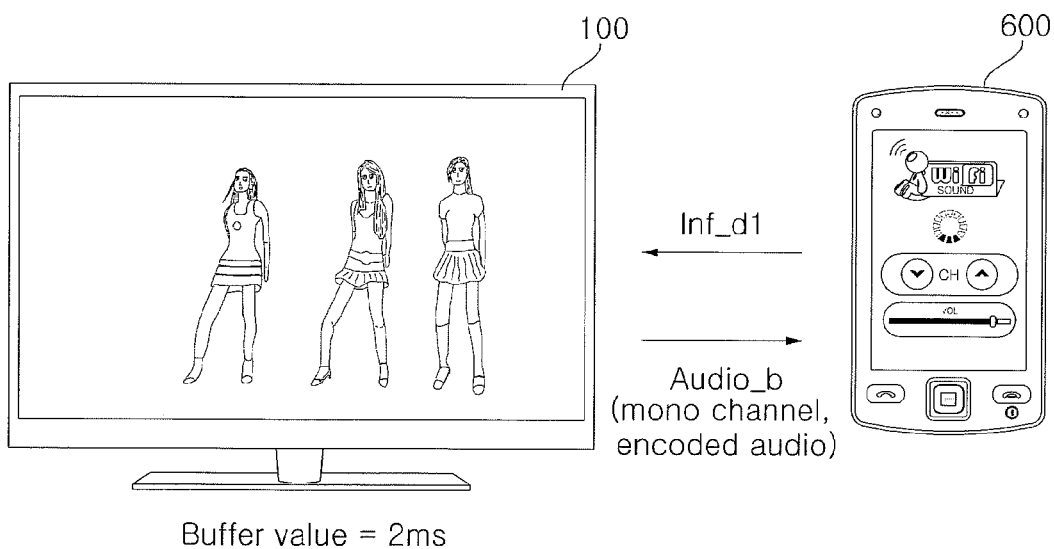

FIG. 22B shows transmission of second audio data Audio_b (mono channel and encoded audio data) from the image display apparatus 100 to the mobile terminal 600 if the image display apparatus 100 receives playback delay information Inf_d1 from the mobile terminal 600. That is, audio data, the number of channels of which is changed from 2 to 1, is transmitted.

The number of channels may be changed by the converter 1085 of the image display apparatus 100.

The buffer 1190 of the mobile terminal 600 temporarily stores the audio data, the number of channels of which is changed.

Next, the playback manager 1170 of the mobile terminal 600 calculates playback delay information with respect to the audio data, the number of channels of which is changed (S2127). The playback manager 1170 of the mobile terminal 600 may calculate the playback delay information of the audio data based on audio data received from the image display apparatus, playback point-of-time information and current time information and the current time information from the synchronizer 1180.

The playback manager 1170 of the mobile terminal 600 controls playback of the audio data, the number of channels of which is changed. Since the channel is changed from a stereo channel to a mono channel, an audio playback time may be reduced. Thus, the audio data may be played back in synchronization with the multimedia data played back by the image display apparatus 100.

The playback manager 1170 of the mobile terminal 600 determines whether the playback delay information calculated in operation S2127 is equal to or greater than a predetermined value (S2133) and, if so, controls transmission of the playback delay information to the image display apparatus 100 (S2135). Then, the image display apparatus 100 receives the playback delay information (S2035).

Next, if the image display apparatus 100 additionally receives the playback delay information, for example, operation S2030 and subsequent operations thereof will be performed.

That is, the image display apparatus 100 delays the playback time of the multimedia data (S2040). It is determined whether playback delay information is additionally received (S2045), and, if playback delay information is additionally received, audio data, the encoding state of which is changed, is transmitted to the mobile terminal 600 (S2050). The image display apparatus 100 plays back multimedia data (S2070).

Figure 22C:
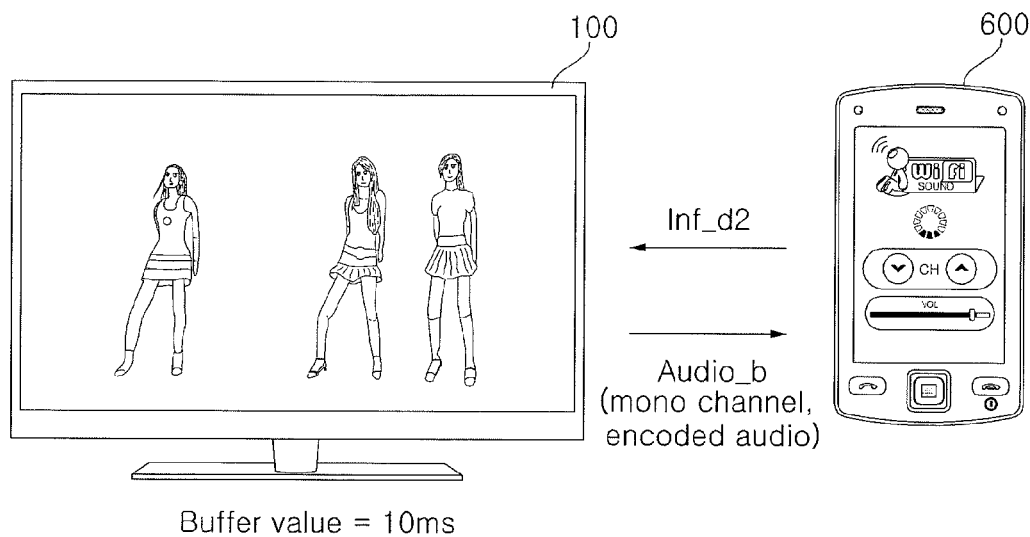

FIG. 22C shows delay of the playback time of the image display apparatus 100 when the image display apparatus 100 additionally receives playback delay information Inf_d2 from the mobile terminal 600.

That is, in FIG. 22C, the buffering value of the buffer 1090 of the image display apparatus 100 is changed from 2 ms to 10 ms. As the buffering value is increased, the output time of the video data output from the buffer 1090 to the display 180 is delayed and thus the playback time of the multimedia data is delayed. The increase amount of the buffering value may be determined according to playback delay information Inf_d2.

Since the playback time of the multimedia data is delayed, second audio data Audio_b (mono channel and encoded audio data) may be continuously transmitted from the image display apparatus 100 to the mobile terminal 600 without change.

Figure 22D:
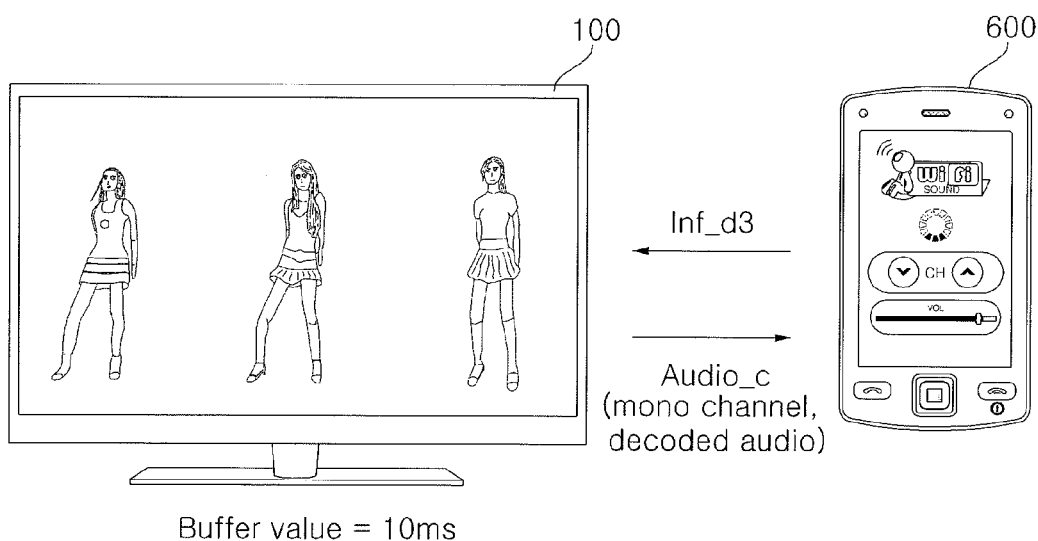

FIG. 22D shows transmission of third audio data Audio_c (mono channel and decoded audio data) from the image display apparatus 100 to the mobile terminal 600 if the image display apparatus 100 additionally receives playback delay information Inf_d3 from the mobile terminal 600. That is, the encoding state of the audio data is changed from the encoded audio data to the decoded audio data.

The encoding state may be changed by the converter 1085 of the image display apparatus 100. That is, the converter 1085 may output the audio data of ① demultilexed by the DEMUX 310 or the audio data of ② encoded by the encoder 1040 and then output the audio data of ③ decoded by the decoder 1030.

The buffer 1190 of the mobile terminal 600 temporarily stores the received audio data and the playback manager 1170 of the mobile terminal 600 provides the audio data to the audio output module 653 without use of the decoder 1130 such that the audio data is audibly output.

Next, if the playback delay information is additionally received in operation S2035, operation S2055 and subsequent operations thereof may be performed.

That is, the image display apparatus 100 transmits audio data, the encoding state of which is changed. Then, the mobile terminal 600 receives the audio data, the encoding state of which is changed (S2155). The image display apparatus 100 delays the playback time of the multimedia data (S2065) if the playback delay information is additionally received (S2060). The image display apparatus 100 plays back multimedia data (S2070). Then mobile terminal 600 receives the audio data, the encoding state of which is changed (S2155) and plays back audio data (S2170).

Operations 2055 to S2065 (S2055, S2060 and S2065) correspond to operations 2040 to S2050 (S2040, S2045 and S2050) except that the encoding state is changed and the playback time of the multimedia data of the image display apparatus is delayed after the number of audio channel is changed.

Operations S2040 to S2050 (S2040, S2045 and S2050) and operations S2055 to S2065 (S2055, S2060 and S2065) may be alternately performed. That is, if operations S2040 to S2050 (S2040, S2045 and S2050) are performed, operations S2055 to S2065 (S2055, S2060 and S2065) may not be performed. Alternatively, if operations S2055 to S2065 (S2055, S2060 and S2065) is performed, operations S2040 to S2050 (S2040, S2045 and S2050) may not be performed.

Figure 23A:
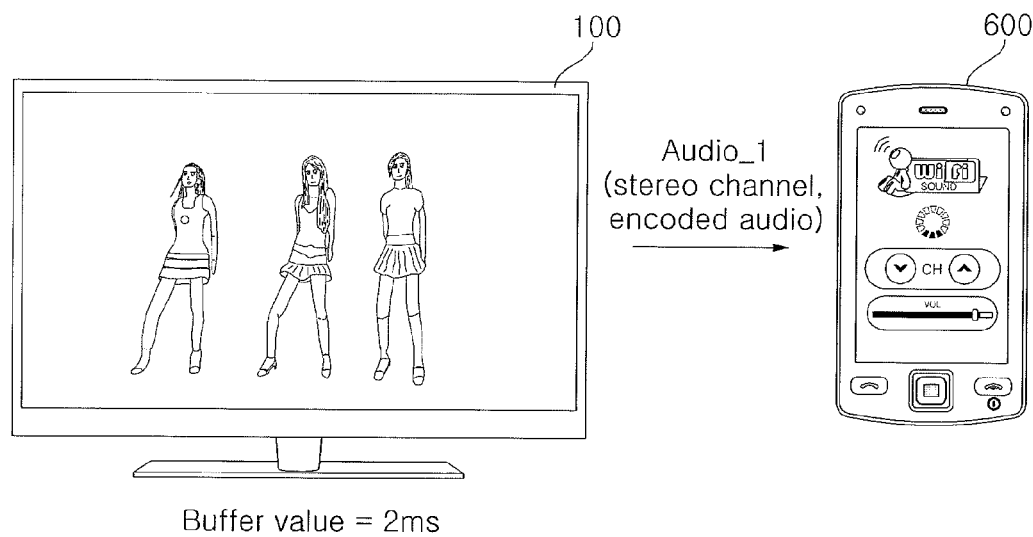

FIG. 23A shows transmission of first audio data Audio_1 (stereo channel and encoded audio data) from the image display apparatus 100 to the mobile terminal 600, similarly to FIG. 22A.

Figure 23B:
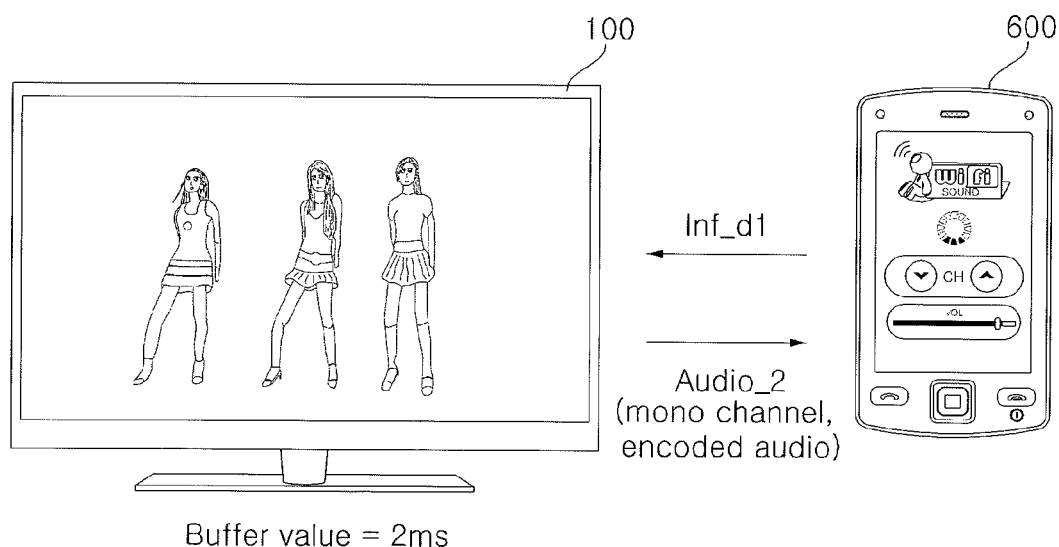

FIG. 23B shows transmission of second audio data Audio_2 (mono channel and encoded audio data) from the image display apparatus 100 to the mobile terminal 600 if the image display apparatus 100 receives playback delay information Inf_d1 from the mobile terminal 600. That is, audio data, the number of channels of which is changed from 2 to 1, is transmitted.

Figure 23C:
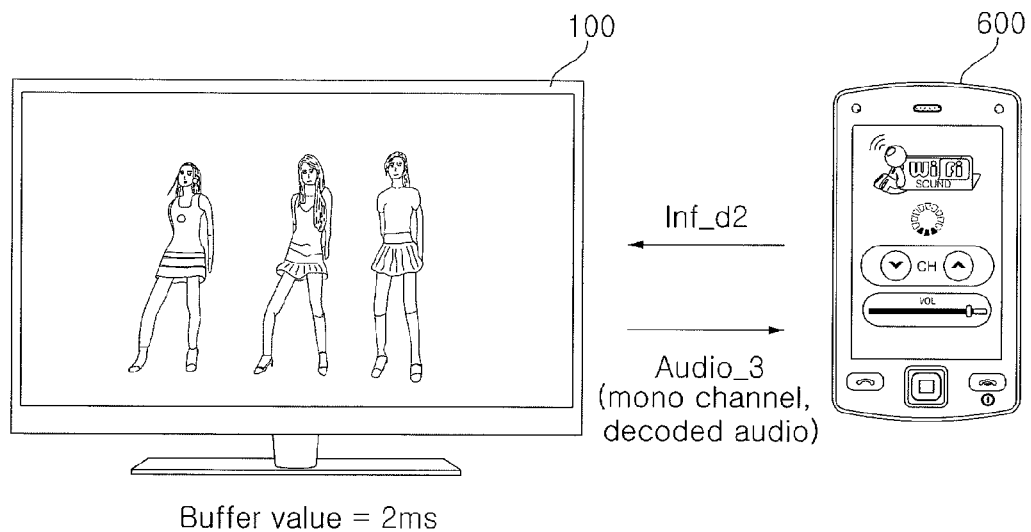

FIG. 23C shows transmission of third audio data Audio_3 (mono channel and decoded audio data) from the image display apparatus 100 to the mobile terminal 600 if the image display apparatus 100 additionally receives playback delay information Inf_d2 from the mobile terminal 600. That is, the audio data is changed from the encoded audio data to the decoded audio data.

Figure 23D:
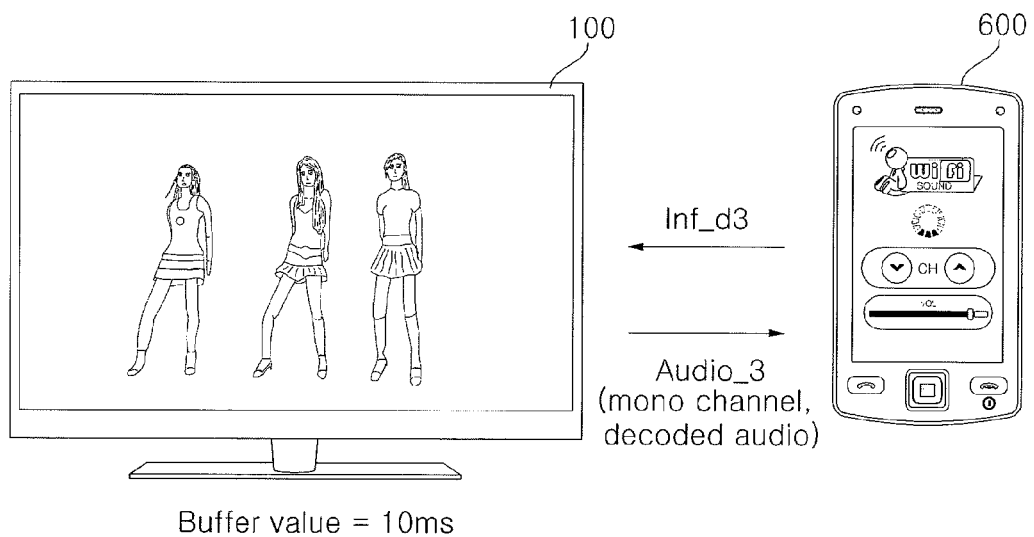

FIG. 23D shows delay of the playback time of the image display apparatus 100 when the image display apparatus 100 additionally receives playback delay information Inf_d3 from the mobile terminal 600.

That is, in FIG. 23D, the buffering value of the buffer 1090 of the image display apparatus 100 is changed from 2 ms to 10 ms. As the buffering value is increased, the output time of the video data output from the buffer 1090 to the display 180 is delayed and thus the playback time of the multimedia data is delayed. The increase amount of the buffering value may be determined according to playback delay information Inf_d3.

Although data exchange is shown as being directly performed between the image display apparatus 100 and the mobile terminal 600 in FIG. 10 and subsequent figures thereof, the invention is not limited thereto. That is, as described with reference to FIG. 1, data exchange may be performed between the image display apparatus 100 and the mobile terminal 600 via the network router 500.

According to an embodiment of the invention, an image display apparatus performs synchronization with a mobile terminal using a first wireless communication method according to wireless audio transmission mode and transmits extracted audio data to the mobile terminal using a second wireless communication method different from the first wireless communication method. By performing synchronization and audio data transmission using different wireless communication methods, it is possible to efficiently perform wireless audio data transmission. Accordingly, it is possible to improve user convenience.

In particular, if a transmission control protocol (TCP) based communication method is used as the first wireless communication method, it is possible to secure data communication reliability of control data and feedback data.

If a real time transmission protocol (RTP)/user datagram protocol (UDP) based communication method is used as the second wireless communication method, it is possible to enable low-delay streaming of audio data and multi-user support.

According to another embodiment of the invention, an image display apparatus transmits audio data of an encoding level corresponding to decoding information received from a mobile terminal. Thus, audio data corresponding to multimedia data played back by the image display apparatus can be played back by the mobile terminal. Accordingly, it is possible to improve user convenience.

If wireless channel environment information or playback delay information of the mobile terminal is received while the image display apparatus plays back multimedia data or the mobile terminal plays back audio data, the image display apparatus performs an operation for changing the number of channels of the audio data to be transmitted, an operation for delaying a playback time of the multimedia data or an operation for changing an encoding state of the audio data to be transmitted based on such information. Thus, multimedia data playback can be synchronized with audio data playback of the mobile terminal. Accordingly, a user can listen to the audio data synchronized with the multimedia data using the mobile terminal.

By executing the wireless audio transmission mode with respect to the mobile terminal, only a user who wishes to listen to audio data can listen to the audio data and a user which does not wish to listen to the audio data cannot listen to the audio data. Accordingly, it is possible to provide a service according to user preference and improve user convenience.

The image display apparatus and the method for operating the same according to the foregoing embodiments are not restricted to the embodiments set forth herein. Therefore, variations and combinations of the example embodiments set forth herein may fall within the scope of the invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an image display apparatus, the method comprising:
    receiving a wireless audio transmission mode entrance signal from a mobile terminal;
    transmitting information about audio data to be transmitted to the mobile terminal;
    receiving decoding information from the mobile terminal;
    transmitting audio data of an encoding state corresponding to the decoding information; and
    playing back multimedia data associated with the audio data,
    wherein, if wireless channel environment information between the mobile terminal and the image display apparatus or playback delay information of the mobile terminal is received during multimedia data playback, performing signal processing such that the multimedia data playback is synchronized with audio data playback of the mobile terminal based on the wireless channel environment information or the playback delay information.

2. The method according to claim 1, wherein the information about the audio data includes at least one of information about the number of channels, encoding state information, encoding scheme information, playback point-of-time information and current time information of the audio data to be transmitted.

3. The method according to claim 1, wherein the transmitting of the audio data includes:
    transmitting audio data demultiplexed from the multimedia data and not decoded if the decoding information indicates that the audio data can be decoded; and
    transmitting the audio data demultiplexed from the multimedia data and decoded if the decoding information indicates that the audio data cannot be decoded.

4. The method according to claim 1, wherein:
    the reception of the wireless audio transmission mode entrance signal, the transmission of the information about the audio data and the reception of the decoding information are performed based on a first wireless communication method, and
    the transmission of the audio data is performed based on a second wireless communication method different from the first wireless communication method.

5. The method according to claim 1, wherein the performing signal processing such that the multimedia data playback is synchronized with audio data playback of the mobile terminal comprises at least one of:
    based on the wireless channel environment information or the playback delay information,
    changing the number of channels of the transmitted audio data;
    delaying a playback time of the multimedia data; and
    changing an encoding state of the audio data to be transmitted.

6. A method for operating a mobile terminal, the method comprising:
    transmitting a wireless audio transmission mode entrance signal to an image display apparatus;
    receiving information about audio data to be transmitted from the image display apparatus;
    transmitting decoding information indicating whether audio data to be received can be decoded to the image display apparatus based on information about the audio data;
    receiving audio data of an encoding state corresponding to the decoding information from the image display apparatus; and
    playing back the received audio data,
    wherein, if wireless channel environment information between the mobile terminal and the image display apparatus or playback delay information of the mobile terminal is received to the image display apparatus during multimedia data playback, the image display apparatus performs signal processing such that the multimedia data playback is synchronized with audio data playback of the mobile terminal based on the wireless channel environment information or the playback delay information.

7. The method according to claim 6, wherein the receiving the audio data of the encoding state corresponding to the decoding information includes:
    receiving audio data demultiplexed from the multimedia data and not decoded if the decoding information indicates that the audio data can be decoded; and
    receiving audio data demultiplexed from the multimedia data and decoded if the decoding information indicates that the audio data cannot be decoded.

8. An image display apparatus comprising:
    a display;
    a network interface to exchange data with a mobile terminal; and
    a controller to transmit information about audio data to be transmitted to the mobile terminal if a wireless audio transmission mode entrance signal is received from the mobile terminal, to transmit audio data of an encoding state corresponding to decoding information if the decoding information is received from the mobile terminal, and to play back multimedia data associated with the audio data,
    wherein, if wireless channel environment information between the mobile terminal and the image display apparatus or playback delay information of the mobile terminal is received during multimedia data playback, the controller performs signal processing such that the multimedia data playback is synchronized with audio data playback of the mobile terminal based on the wireless channel environment information or the playback delay information.

9. The image display apparatus according to claim 8, wherein the controller performs at least one of an operation for changing the number of channels of the audio data to be transmitted, an operation for delaying a playback time of the multimedia data and an operation for changing an encoding state of the audio data to be transmitted.

10. A mobile terminal comprising:
an audio output module to output an audio signal to be played back;
a wireless communication unit to exchange data with an image display apparatus; and
a controller to transmit a wireless audio transmission mode entrance signal to the image display apparatus, to transmit decoding information indicating whether audio data to be received can be decoded to the image display apparatus based on information about audio data if the information about the audio data is received from the image display apparatus, and to play back the received audio data if audio data of an encoding state corresponding to the decoding information is received from the image display apparatus, wherein, if wireless channel environment information between the mobile terminal and the image display apparatus or playback delay information of the mobile terminal is received to the image display apparatus during multimedia data playback, the controller controls the image display apparatus to perform signal processing such that the multimedia data playback is synchronized with audio data playback of the mobile terminal based on the wireless channel environment information or the playback delay information.

11. The mobile terminal according to claim 10, wherein the controller calculates playback delay information of the audio data, transmits wireless channel environment information between the mobile terminal and the image display apparatus or the playback delay information to the image display apparatus, and plays back the audio data if the audio data corresponding to the wireless channel environment information or the playback delay information is received.

* * * * *